(12) United States Patent
Merz et al.

(10) Patent No.: US 10,592,963 B2
(45) Date of Patent: Mar. 17, 2020

(54) ENHANCED SMART REFRIGERATOR SYSTEMS AND METHODS

(71) Applicant: MasterCard International Incorporated, Purchase, NY (US)

(72) Inventors: Christopher John Merz, Wildwood, MO (US); Derek Humphreys, Co. Dublin (IE); Oran Cummins, Dublin (IE); Andrea Rizzini, Dublin (IE); Stephen Elder, Co. Dublin (IE); Stephen Toner, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 620 days.

(21) Appl. No.: 15/222,533

(22) Filed: Jul. 28, 2016

(65) Prior Publication Data

US 2017/0032446 A1    Feb. 2, 2017

Related U.S. Application Data

(60) Provisional application No. 62/198,031, filed on Jul. 28, 2015.

(51) Int. Cl.
*G06Q 30/00* (2012.01)
*G06Q 30/06* (2012.01)
(Continued)

(52) U.S. Cl.
CPC ..... *G06Q 30/0633* (2013.01); *G06F 16/2477* (2019.01); *G06F 16/24575* (2019.01);
(Continued)

(58) Field of Classification Search
CPC ...................................................... G06Q 30/00
See application file for complete search history.

(56) References Cited

U.S. PATENT DOCUMENTS

| 6,123,259 | A | 9/2000 | Ogasawara |
| 6,129,274 | A | 10/2000 | Suzuki |

(Continued)

FOREIGN PATENT DOCUMENTS

JP    2006209382 A    8/2006

OTHER PUBLICATIONS

Byford, Sam. "Tweet my fridge: the bizarre home appliances of CES." <https://www.theverge.com/2013/1/16/3867932/evemote-on-your-fridge-ces-home-appliance-insanity> (Year: 2013).*

(Continued)

*Primary Examiner* — Abby J Flynn
(74) *Attorney, Agent, or Firm* — Armstrong Teasdale LLP

(57) ABSTRACT

An enhanced smart refrigerator (ESR) for automatically populating a virtual shopping cart is provided. The ESR stores a purchase log including a purchase history of a target product. The ESR determines a current interval between a most recent delivery date and a proposed next delivery date based on the purchase history of the target product, and calculates a purchase propensity for the target product based on the current interval and the purchase history of the target product, and automatically adds the product to the virtual shopping cart for submission to a party for purchase of the target product if the purchase propensity meets a first criteria.

29 Claims, 5 Drawing Sheets

(51) Int. Cl.
*G06F 16/2458* (2019.01)
*G06F 16/2457* (2019.01)
*G06Q 30/02* (2012.01)
*G06Q 10/08* (2012.01)

(52) U.S. Cl.
CPC ....... *G06Q 10/087* (2013.01); *G06Q 30/0202* (2013.01); *G06Q 30/0603* (2013.01); *G06Q 30/0605* (2013.01); *G06Q 30/0641* (2013.01)

(56) References Cited

U.S. PATENT DOCUMENTS

| | | | |
|---|---|---|---|
| 6,204,763 B1 * | 3/2001 | Sone | A47G 29/141 |
| | | | 221/2 |
| 6,965,871 B1 * | 11/2005 | Szabo | G06Q 10/087 |
| | | | 186/56 |
| 7,130,814 B1 | 10/2006 | Szabo et al. | |
| 2004/0093274 A1 | 5/2004 | Vanska et al. | |
| 2005/0080683 A1 | 4/2005 | Jordan | |
| 2006/0242084 A1 | 10/2006 | Moses | |
| 2010/0030624 A1 | 2/2010 | Vaenskae et al. | |
| 2013/0077534 A1 * | 3/2013 | Hu | H04L 41/5054 |
| | | | 370/259 |
| 2013/0173419 A1 * | 7/2013 | Farber | G06Q 30/0631 |
| | | | 705/26.7 |
| 2014/0019313 A1 * | 1/2014 | Hu | G06Q 10/087 |
| | | | 705/28 |
| 2015/0149298 A1 | 5/2015 | Tapley | |
| 2015/0302510 A1 * | 10/2015 | Godsey | G06Q 30/0635 |
| | | | 705/26.81 |
| 2016/0140526 A1 | 5/2016 | Cummins et al. | |

OTHER PUBLICATIONS

Porter, Alex. "LG's Smart Refrigerator is Smarter Than Ever." <https://www.techlicious.com/blog/lgs-smart-refrigerator-gets-smarter-than-ever/> (Year: 2012).*

Barclay, Eliza. "The 'Smart Fridge' Finds the Lost Lettuce, for a Price" <https://www.npr.org/sections/thesalt/2012/05/03/151968878/the-smart-fridge-finds-the-lost-lettuce-for-a-price> (Year: 2012).*

PCT Search Report and Written Opinion, Application No. PCT/US2016/044396, dated Nov. 1, 2016, 7 pps.

European Extended Search Report, Application No. 16831331.0, dated Jan. 8, 2019, 8 pps.

* cited by examiner

ENHANCED SMART REFRIGERATOR SYSTEMS AND METHODS

CROSS-REFERENCE TO RELATED APPLICATIONS

This application claims the benefit of priority to U.S. Provisional Patent Application No. 62/198,031, filed Jul. 28, 2015, the entire contents and disclosure of which are hereby incorporated by reference herein in their entirety.

BACKGROUND

This disclosure relates to smart refrigerators, and more specifically to an enhanced smart refrigerator for automatically populating a virtual shopping cart based on a calculated usage pattern of a consumer.

Many consumers purchase household items, including groceries, toiletries, cleaning supplies, and healthcare items, at fairly regular or consistent intervals. However, the length of these purchase intervals is highly dependent on the consumer or household. For example, a household that includes a family of four may purchase a gallon of milk and a dozen eggs approximately every week, a case of paper towels approximately every four weeks, and a container of over-the-counter pain reliever approximately every eight weeks. However, a person living by themselves may purchase a half-gallon of milk every week, a half-dozen eggs only every two weeks, and a case of paper towels every eight weeks. Accordingly, it should be understood that consumer usage or purchase patterns, or how often each consumer purchases a particular household item, are unique relative to each consumer (or to each household).

As technology becomes "smarter" (e.g., processing capability and speeds increase, connectivity increases), the "Internet of Things" has expanded. The Internet of Things refers generally to an interconnectivity to the Internet of previously unconnected items, such as watches, refrigerators, automobiles, and thermostats. The Internet of Things enables new functionality for these items, which, in some cases, can make the lives of consumers more efficient and more enjoyable. For example, smart refrigerators with Internet connectivity functionality may enable users to download recipes, view weather reports, maintain household calendars, and interact with social media, all through a user interface of the smart refrigerator. It may, however, be desirable to enhance the "smartness" of the smart refrigerator and expand its functionality for the consumer.

BRIEF DESCRIPTION OF THE DISCLOSURE

In one aspect, an enhanced smart refrigerator (ESR) for automatically populating a virtual shopping cart is provided. The ESR includes a processor, the virtual shopping cart, and a memory in communication with the processor. The processor is programmed to store a purchase log within the memory, the purchase log including a purchase history of a target product. The processor is also programmed to determine a current interval between a most recent delivery date of the target product and a proposed next delivery date of the target product based on the purchase history of the target product. Additionally, the processor is programmed to calculate a purchase propensity for the target product based on the current interval and the purchase history of the target product, and automatically add the target product to the virtual shopping cart for submission to a party for purchase of the target product, if the purchase propensity meets a first criteria.

In another aspect, a computer-implemented method for automatically populating a virtual shopping cart using an enhanced smart refrigerator (ESR) is provided. The ESR includes a processor, the virtual shopping cart, and a memory in communication with the processor. The method includes storing, by the ESR, a purchase log within the memory, the purchase log including a purchase history of a target product. The method also determining a current interval between a most recent delivery date of the target product and a proposed next delivery date of the target product based on the purchase history of the target product. Additionally, the method includes calculating a purchase propensity for the target product based on the current interval and the purchase history of the target product, and automatically adding the target product to the virtual shopping cart for submission to a party for purchase of the target product, if the purchase propensity meets a first criteria.

In yet another aspect, at least one non-transitory computer-readable storage media having computer-executable instructions embodied thereon is provided. When executed by at least one processor, the computer-executable instructions cause the processor to store a purchase log within the memory, the purchase log including a purchase history of a target product. The computer-executable instructions also cause the processor to determine a current interval between a most recent delivery date of the target product and a proposed next delivery date of the target product based on the purchase history of the target product. Additionally, the computer-executable instructions cause the processor to calculate a purchase propensity for the target product based on the current interval and the purchase history of the target product, and automatically add the target product to the virtual shopping cart for submission to a party for purchase of the target product, if the purchase propensity meets a first criteria.

In a further aspect, a computing device for automatically populating a virtual shopping cart is provided. The computing device includes a processor, a memory, and the virtual shopping cart, wherein said computing device is configured to store a purchase log within the memory, the purchase log including a purchase history of a target product. The computing device is also configured to determine a current interval between a most recent delivery date of the target product and a proposed next delivery date of the target product based on the purchase history of the target product, and to calculate a purchase propensity for the target product based on the current interval and the purchase history of the target product. The computing device is also configured to automatically add the target product to the virtual shopping cart for submission to a party for purchase of the target product, if the purchase propensity meets a first criteria.

BRIEF DESCRIPTION OF THE DRAWINGS

FIG. 1 is a block diagram of the virtual shopping system including an enhanced smart refrigerator (ESR) with usage pattern functionality.

FIG. 2 is a block diagram of an example embodiment of the ESR with usage pattern functionality shown in FIG. 1.

FIG. 3 is an example embodiment of a virtual shopping cart automatically populated by the ESR shown in FIG. 2.

FIG. 4 is a flowchart of a process for automatically populating a virtual shopping cart based on consumer usage behavior using the virtual shopping system shown in FIG. 1.

FIG. 5 is a diagram of components of an ESR that may be used in the virtual shopping system shown in FIG. 1.

Figure 1:
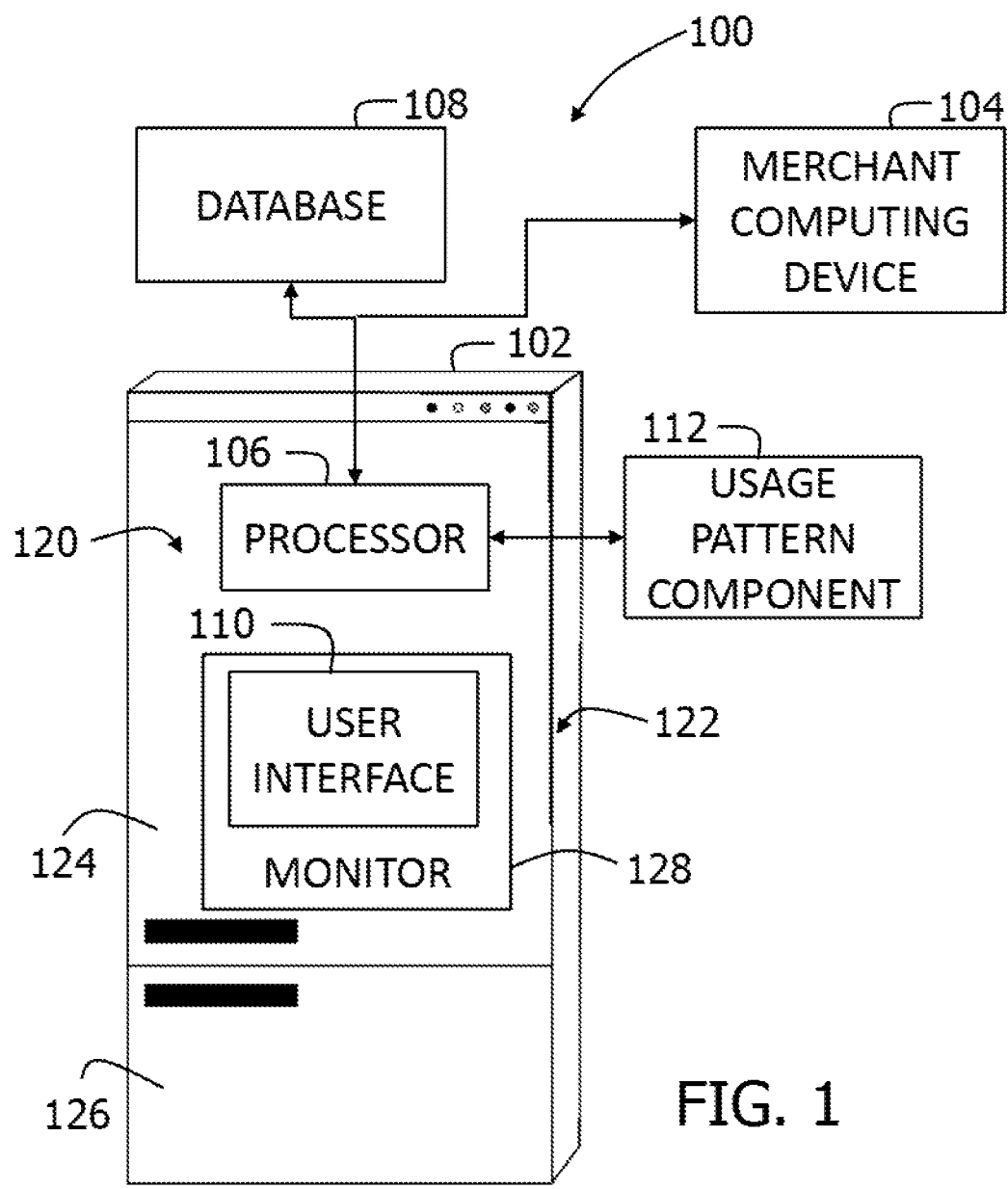
FIGS. 1-5 show example embodiments of the methods and systems described herein.

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The virtual shopping system described herein includes an enhanced smart refrigerator (ESR) having a user interface that enables a user to make household purchases (e.g., groceries, toiletries, cleaning supplies, etc.) directly through a virtual shopping cart persisting or existing on the user interface. The virtual shopping system also includes at least one processor, which may be included with the ESR or remote from the ESR, for executing a purchase pattern algorithm that enables the ESR to determine whether to add a particular product to the consumer's virtual shopping cart. In the example embodiment, the purchase pattern algorithm may be included with or part of a purchase pattern component that is executable by the processor to perform the steps described herein.

As used herein, "purchase pattern" may also be referred to as a "usage pattern," because a purchase of a product typically results from an actual usage of the product. Based on input data representing an available product catalog and actual consumer behavior (e.g., the consumer's usage or purchase patterns), the usage pattern component is configured to output a predicted purchase propensity (i.e., the likelihood that the consumer would add a target product to their shopping cart) for the specific consumer for the specific target product. The virtual shopping system further includes a memory device such as a database, which may be centralized at the ESR or non-centralized, for storing a product catalog and data related to the household purchases, as will be described more fully herein.

The ESR includes the usage pattern component, as described herein, which may implement the usage pattern algorithm and, in some embodiments, a cart population algorithm. The ESR further includes online shopping functionality, for example, as software downloaded onto the smart refrigerator (e.g., as an "app" or other program), with which the consumer may interact using the user interface. It should be understood that although described as an "enhanced smart refrigerator," the functionality of the ESR as described herein may be implemented on another smart appliance (e.g., an oven, a microwave, etc.) and/or a computing device integrated into a "smart kitchen" (e.g., a smart phone, tablet, desktop, laptop, and/or a dedicated "smart home" computing device). The ESR enables the consumer to interact with a plurality of virtual merchants (i.e., a merchant having an online presence for consumers to make purchases from the merchants online) with online product catalogs. In the example embodiment, the ESR has access to the product catalog of the merchant (as well as product catalogs for a plurality of other merchants). The product catalog may be stored at the ESR, or may be stored at a remote database. The product catalog includes a structured ontology used to categorize the various products available for purchase. For example, the ontology of one product catalog may be hierarchical, such that "milk" may be categorized under Grocery>Dairy>Milk.

The product catalog also includes associated default half-lives for the available products. As used herein, a "half-life" for a product refers to a length of time, from an initial purchase of the product, where a typical consumer would have consumed half of the product. Accordingly, after the product's half-life has passed, a consumer is likely to purchase the item again (because, for example, the consumer needs or wants the product again). A "default half-life" for a product is generated by the virtual shopping system as an initial input to the usage pattern component. The default half-life refers to a global (e.g., broad) estimate for the half-life of the product, and may be generated by the virtual shopping system based on expected, typical, or average consumption of the product. The default half-life for a product may be any value, from 1 day to n days, wherein n is an integer greater than 1. For example, a gallon of milk may be assigned a default half-life of 7 days. As another example, all "Dairy" products in a product catalog may be assigned a default half-life of 7 days, and all "Spices" products in the product catalog may be assigned a default half-life of 30 days (because, in at least some cases, spices may take longer to consume or use as compared to a gallon of milk or a block of cheese, and spices have a longer expiration period). The ESR uses the assigned default half-life for a product as a starting point or initial assumption about a consumer's usage patterns for the product as an initial input to the usage pattern component, to implement the usage pattern algorithm in a setup phase. However, as explained below, the usage pattern algorithm is self-refining to align with actual consumer usage behavior after one or more iterations. The virtual shopping system may use the ontology of the product catalog to assign each default half-life to individual products or groups of products.

To make a purchase, the consumer searches the product catalog for the merchant and adds products to their virtual shopping cart. Once the consumer has added all products that the consumer wants or needs to the shopping cart, the consumer may initiate an online checkout process as required by the particular merchant. The ESR maintains a purchase log of the consumer's purchase history, the purchase history including each purchase made by the consumer through the user interface of the ESR. For example, the ESR may monitor and log which products the consumer purchased and amounts or quantities thereof, when a purchase of each product occurred (e.g., a particular date or day of the week, a particular time), which merchant the consumer purchased from, and/or brands of purchased products. The purchase log may be stored at the ESR at an integrated memory device, or may be stored at a remote database. The purchase log facilitates tracking of the intervals between sequential purchases of a target product, for example, how may days pass between purchases of milk. In some embodiments, the ESR may further store a delivery log that may be updated or provided by the merchant(s) from whom the consumer has purchased products. Because some products may be delivered at different times (although the products were purchased at the same time), the delivery log serves as a reference for the actual delivery date corresponding to each product.

The ESR is configured to use the usage pattern component to determine when to automatically place a target product into the consumer's virtual shopping cart. Such automatic shopping cart loading may be especially useful for a consumer for loading those staple products that the consumer uses and purchases frequently, as the consumer would no longer need to search a merchant product catalog for each and every product they wish to purchase, each time they make a purchase. In addition, the user no longer needs to scan products in or out of the ESR to indicate purchase and/or use to the ESR. In particular, the usage pattern component uses an algorithm that initially factors the default half-life for a target product and logged consumer behavior to determine a degree of need for the target product. The degree of need for the product is relative to a "current interval," which is defined herein as a number of days between the last delivery date and the proposed delivery date, as shown in Equation 1:

$$T_{currentInterval} = T_{proposedDelivery} - T_{lastDelivery} \quad (1)$$

The current interval is determined by the ESR according to the usage and/or purchase behavior of the user. For example, the ESR may determine that orders from a particular merchant (from which the user always or frequently orders) are always delivered on a particular day of the week (e.g., on Tuesdays) or according to a particular pattern or interval (e.g., every five days; Mondays, Wednesdays, and Fridays, etc.). In some cases, the merchant may be configured to make same-day deliveries of products purchased, in which case the "last delivery date" may be the same as a last purchase date, and the "proposed delivery date" may be the same as a proposed purchase date. In other cases, there may be a one- or two-day interval between purchase and delivery. However, as the usage pattern component only takes into account the interval between the last delivery and the next, proposed delivery, such purchase-delivery discrepancies do not affect the calculation in Equation 1.

The current need for a particular target product is then calculated according to Equation 2, wherein the current need is represented as a scaled value between 0 and 1.

$$N_{currentInterval} = (H_{product})^{T_{currentInterval}}, \quad (2)$$

where $$H_{product} = \left(\frac{1}{2}\right)^{\frac{1}{ProductHalfLife}} \quad (3)$$

A value of $N_{currentInterval}$ closer to 0 indicates a greater need for the target product by the consumer, and a value closer to 1 indicates a lesser need by the consumer, for intervals that are anticipated to be close to a product's default half-life. As described above, each product in a product catalog may be assigned a default half-life generated by the virtual shopping system. The first time the ESR implements the usage pattern algorithm for the consumer, the variable "ProductHalfLife" in Equation 3 is the default half-life. As the ESR logs more usage or purchase data from the consumer, ProductHalfLife is updated to reflect the "real" half-life of the product for the consumer. In other words, ProductHalfLife is updated to reflect how long that particular consumer takes (in days) to likely consume or use half of the product, such that the consumer is more likely than not to need to purchase the product during the next transaction. In this manner, the input to the usage pattern component, and therefore the output therefrom, is continually tailored to the real usage behavior of the consumer for each product used and/or purchased by the consumer.

Take, for example, a gallon of milk. As described above, a gallon of milk may be assigned a default half-life of 7 days and a current interval of 7 days may exist between the last delivery and the next proposed delivery, wherein the consumer is more likely than not to need/want to purchase another gallon of milk. For a gallon of milk with a half-life of 7 days, and for a current interval of 7 days (i.e., $T_{currentInterval}=7$):

$$H_{product} = \left(\frac{1}{2}\right)^{\frac{1}{ProductHalfLife}} = \left(\frac{1}{2}\right)^{\frac{1}{7}} = .9057,$$

such that
$N_{currentInterval} = (0.9057)^7 = 0.5$, or the "need" for the product for the current interval is 0.5, thus the consumer likely needs the gallon of milk (though the need is not great). For the same gallon of milk with a current interval of 11 days (i.e., a much longer time than the expected, typical, or default interval between purchases), the need is much greater:
$N_{currentInterval} = (0.9057)^{11} = 0.33$. Because the scaled value for $N_{currentInterval}$ for 11 days is closer to zero (0.33) than the scaled value for 7 days (0.5), the ESR determines the consumer's need for the gallon of milk is greater for the 11-day purchase interval.

The usage pattern component is configured to account for the particular consumer's usage behavior, and accordingly the ESR may input data to the usage pattern component from a number of previous purchases. For example, the ESR may have logged purchase data from three previous purchases. For one purchase (a "first purchase" of the three purchases), 10 days passed before the first purchase of a gallon of milk. For a second purchase of the three purchases, 8 days passed (i.e., there was an interval of 8 days between the first purchase and the second purchase). For a third purchase of the three purchases, 9 days passed (i.e., there was an interval of 9 days between the second purchase and the third purchase). Still using the default product half-life of 7 days for the gallon of milk:

$N_{interval,1} = (0.9057)^{10} = 0.37$ $N_{interval,2} = (0.9057)^8 = 0.45$ $N_{interval,3} = (0.9057)^9 = 0.41$, such that an "average need" over the three intervals is calculated according to Equation 4:

$$N_{average} = \frac{\sum_{i=1}^{n} N_{interval,t}}{n}. \quad (4)$$

Accordingly, the average need is:

$$\frac{0.37 + 0.45 + 0.41}{3} = 0.41.$$

The ESR is configured to store this average or "historical" need for each target product purchased by the consumer.

Subsequently, the ESR is configured to employ the usage pattern algorithm to compare the need for the current interval (Equation 2) to the average need over a number of previous purchases (three previous purchases, in this example), and map the comparison to a value between 0 and 1 to determine a purchase propensity for the product. The purchase propensity is calculated using the sigmoid function of Equation 5:

$$P_{product} = \frac{1}{1 + e^{-a(N_{average} - N_{currentInterval})}}, \quad (5)$$

where a is an arbitrary value and is set, in the example embodiments described herein, to 15. It should be understood that the variable a may be any other value without departing from the scope of the disclosure. A value of $P_{product}$ nearer to 1 is a high purchase propensity (a higher likelihood that the product will be purchased by the consumer in the next purchase), and a value nearer to 0 is a low purchase propensity. The usage pattern algorithm employs the sigmoid function of Equation 5 such that the purchase propensity is bounded between zero and one, which facilitates the use of a single purchase propensity threshold for all products. The ESR uses the purchase propensity as a threshold to determine whether the target product will be automatically placed in the consumer's shopping cart. In one embodiment, if $P_{product}$ is greater than or equal to 0.5, the ESR will automatically place the corresponding target product in the consumer's shopping cart. If $P_{product}$ is less than 0.5, the ESR will not place the corresponding target product in the shopping cart.

Returning to the "gallon of milk" example, with an average need of 0.41 as described above, and with a current need (for a current interval of 11 days) of 0.33, the purchase propensity for the gallon of milk is calculated using the usage pattern algorithm of Equation 5, as follows:

$$P_{milk} = \frac{1}{1 + e^{-15(0.41 - 0.33)}} = 0.77$$

Accordingly, the purchase propensity for milk is very high; the consumer is very likely to purchase milk in their next purchase, and the ESR will place a gallon of milk into the consumer's shopping cart. It should be understood that although the example of a gallon of milk is used herein, the scope of the disclosure is in no way limited to milk or any other one product. Rather, the various embodiments of the disclosure that are described herein are applicable to a wide variety of products.

As described above, the ESR logs the historical need ($N_{average}$) of each purchased product, wherein the historical need may be calculated as a rolling or moving average of n previous purchases, or may be calculated as a rolling or moving median of n previous purchases (which corresponds to a variable labelled $N_{medium}$ that replaces $N_{average}$ in Equation 5). In the embodiments described herein, n is an integer greater than one. Tracking the historical need over n previous purchases enables the ESR to learn the specific needs and usage patterns of each consumer, which may deviate from an expected usage or purchase interval for a particular target product. Before a consumer has made n purchases, the ESR may input the default product half-life (and, accordingly, a default expected purchase interval corresponding to the default half-life) to the usage pattern component as a starting point for the usage pattern algorithm. Thus, the ESR may initially over- or underestimate the current need of the consumer for a target product. However, after the consumer has made n or more purchases, the usage pattern algorithm converges toward the actual need and purchase behavior of the consumer, such that the learned product half-life and purchase intervals will replace or overrule default values.

Additionally, although the value for n for the number of previous purchases is 3 in the example above, n may be any integer value. In the example embodiment, n is at least 3, such that one unusual purchase interval (e.g., a particularly short or long time between purchases) does not dominate the purchase propensity calculation. In some embodiments, n is an integer between 3 and 20; more specifically, in some embodiments, n may be 3, 5, 7, 10, or 20. In some embodiments, n may vary according to target product and/or consumer.

In some embodiments, the usage pattern component may be configured to account for changes in the quantity of a product purchased. For example, a consumer may typically only purchase one gallon of milk per purchase interval, but may purchase two or more gallons of milk because of a discount or deal offered on the milk. The usage pattern component is configured to account for the additional quantity and to output a lower purchase propensity for the following purchase interval. In one embodiment, the usage pattern component employs the following scaled "need" equation:

$$N_{currentInterval} = Q_{product}(H_{product})^{T_{currentInterval}} \quad (6)$$

which may replace Equation (2), shown above. $Q_{product}$ is a scaling factor configured to account for changes in the quantity of a product purchased. Using the example above, for the purchase interval in which two gallons were purchased as opposed to one gallon, $Q_{product}=2$, which increases the value for N, resulting in a lower calculated need and a correspondingly low purchase propensity output from the usage pattern component.

In some embodiments, the virtual shopping cart may include a ranking or highlighting feature, in which target products of urgent purchase propensity (i.e., the consumer is very likely to need the product by the proposed delivery date) or target products that are frequently purchased (i.e., are purchased in all or almost all of the purchases made by the consumer) may be highlighted or placed at the top of a list of items in the virtual shopping cart. Accordingly, the ESR or the user may define various thresholds of purchase propensity that direct whether or not the product will be added to a highlighted or non-highlighted region of the shopping cart. For example, for a product with a purchase propensity $P_{product}$ between 0.45 and 0.6, the ESR may be configured to place the product into a non-highlighted region of the shopping cart. For a product with a purchase propensity $P_{product}$ greater than 0.6, the ESR may be configured to place the product into a highlighted region of the shopping cart. It should be understood that the values and intervals used herein are for example purposes only and should not be construed to limit the disclosure in any way. Other values, intervals, or thresholds than those described explicitly herein may be used without departing from the scope of the disclosure.

In some embodiments, there may be additional regions in the virtual shopping cart that may be defined according to various criteria. For example, a first or highlighted region may include products with a purchase propensity that meets a first criteria, such as exceeding a first threshold purchase propensity. The first criteria is defined according to a high likelihood of purchase; the usage pattern component has determined that, based on the consumer's usage pattern, the consumer is highly likely to need the product by the next delivery date, and therefore is highly likely to purchase the product in the next purchase on the ESR. Accordingly, those products may be added to the first region of the virtual shopping cart, a "needed products" region. The "needed products" region may correspond to a purchase region of the virtual shopping cart; in other words, products in the "needed products" region may be, as a whole, purchased by the consumer in the next purchase unless removed from the needed products region.

A second or non-highlighted region may include products with a purchase propensity that meets a second criteria, such as falling within a predetermined purchase propensity range. The second criteria may be defined according to a lower likelihood of purchase. In particular, the usage pattern component has determined that, based on the consumer's usage patterns, the consumer may not need the product by the next delivery date, but will likely need the product between the next, proposed delivery date (a "first proposed delivery date") and the delivery date after that (a "second proposed delivery date"). Accordingly, those products may be added to the second region of the virtual shopping cart, a "suggested purchases" region.

In some embodiments, the usage pattern component of the ESR may further include an additional predictive element based on global usage or purchase trends (e.g., usage trends of a plurality of consumers). More specifically, the ESR may be configured to determine, for a particular target product, a likelihood that the particular product would be in "any" virtual shopping cart, and use that likelihood to suggest the particular target product to consumer(s) who have never purchased the target product (i.e., for consumer(s) that have never added the target product to their virtual shopping cart). Such products may be added to the second region of the virtual shopping cart, the "suggested purchases" region, as described above. Alternatively, such products may be added to a third region of the virtual shopping cart, a "new purchases" region, which indicates to the consumer that the products therein have not been purchased before but may be of interest to the consumer.

More particularly, the virtual shopping system (e.g., the ESR and/or a merchant) may assign a global purchase probability $p_{inAnyCart}$ to each product within the product catalog. A gallon of milk may have a global purchase probability of $p_{inAnyCart}(milk)=0.8$, because it is fairly highly likely that any consumer using the ESR may purchase a gallon of milk. However, other products such as a bag of rice, which have a relatively low probability of being in a consumer's virtual shopping cart, may have $p_{inAnyCart}(rice)=0.05$. The global purchase probability $p_{inAnyCart}$ for a product may be determined according to data collected from a plurality of consumers, or may be an estimated value. The ESR may be configured to add products to the "new purchases" region of the virtual shopping cart in a manner that is proportionate to the likelihood that the product would be in any virtual shopping cart to begin with (the global purchase probability $p_{inAnyCart}$). The ESR may implement this feature to introduce the consumer to new products or to alert the consumer to the availability of products that may be purchased through the virtual shopping cart, which the consumer may have been unaware of. For example, the consumer may have been unaware that they could purchase paper towels or dishwasher soap through the virtual shopping cart. In addition, the ESR may implement this feature to suggest products that may not be purchased on a regular purchase cycle and thus the consumer may have not yet had an opportunity or desire to purchase them, such as seasonal items.

In some embodiments, the ESR may accordingly populate one or more of the first, second, and third regions ("needed products," "suggested products," and "new products," respectively) of the virtual shopping cart according to a cart population algorithm, Equation (7), that is also executed by the usage pattern component:

$$p_{inAnyCart}(\text{product}) * P_{product} > \text{threshold} \quad (7),$$

wherein threshold defines which product(s) will be added to which region. The threshold may be implemented as particular values, and/or using other logic. Additionally, the second and/or third region(s) may have a maximum number of products that may be added to the region. For products that have not been purchased by the consumer, the corresponding purchase propensity $P_{product}$ may be determined using the default half-life and the current interval (i.e., without any determinations of historical need from the consumer).

As one example, the threshold for the "needed products" region may be a constant value such as 0.5, with no maximum number of products, and wherein all of products have been previously purchased at least once by the consumer. The threshold for the "suggested products" region may be a particular number of products (e.g., 10 or 15) having the top scores (the outcome of Equation 7) that do not meet the threshold for the "needed products" region. The threshold for the "new products" region may be a constant value (e.g., 0.5), wherein a maximum number of products (e.g., 10 or 15) are added and wherein all of the products have not been previously purchased by the consumer. It should be understood that these threshold criteria are illustrative only and that other criteria, thresholds, values, intervals, and/or product maxima may be used without departing from the scope of the disclosure.

The ESR is configured to integrate feedback from the consumer into the cart population algorithm, as implemented by the usage pattern component. For example, in one embodiment, if the consumer does not add a product from the "new products" region to the "needed products" region, the ESR may not promote that product to the consumer in the future (e.g., may set the $p_{inAnyCart}$ for that product to 0, for that particular consumer). The consumer may alternatively actively remove the product from the "new products" region, and the ESR may not promote that product to the consumer in the future. The consumer may have access to additional commands, such that the consumer may request to be prompted to purchase the product again after a certain interval (e.g., because the consumer has already purchased the product over a different platform, such as at a brick-and-mortar store).

In the example embodiment, the ESR is further configured to provide an initial "registration" or "set-up" phase to the consumer upon first use of the ESR (or upon resetting the ESR or upon requesting, by the consumer, to re-initiate the set-up phase). The set-up phase prompts the consumer to answer a plurality of questions on the ESR user interface in order to initialize various settings of the ESR. The set-up phase may include questions related to the household using the ESR, for example, "How many people are in your household?", "What are the ages of the people in your household?", "How many people in your household are age 23-35?", etc. Answers may be provided as integers (e.g., "5" people in the household), as ranges (e.g., one person in a "23-35" range), or as selections of particular options (e.g., checking a checkbox or selecting a radio button) in various embodiments. The set-up phase may further include questions related to particular dietary restrictions of members of the household using the ESR, for example, "Are any members of the household _Kosher, _Halal, _Vegetarian, _Vegan, _Low Sodium, _Gluten-Free . . . " and/or "Please list any allergens of any members of the household." The consumer may answer as few or as many questions offered during the set-up phase as they desire. For example, there may be a "skip this question" option to select, if the consumer does not wish to respond, and/or a "skip set-up" option to select, if the consumer does not wish to answer any set-up questions. It should be understood that fewer or additional questions may be asked during the set-up phase and that the examples given are illustrative only.

In some embodiments, the responses given during the set-up phase may affect certain initial variables in the usage pattern algorithm and/or the cart population algorithm. For example, the default half-life may be shifted up or down according to the number of people in a household; an initial purchase interval may be increased or decreased according to the number of people in a household; certain products containing allergens or other restricted ingredients may be given a $p_{inAnyCart}$ of zero for the household such that those items will not be suggested to the household; and/or certain products may be suggested to households including infants or toddlers that may not be suggested to households without young children.

The following examples explore different variations of the usage pattern algorithm as applied to various use cases, with an example target product of a gallon of milk. More particularly, Example 1 depicts the usage behavior of a first consumer that uses and/or purchases milk at expected or typical intervals for the product of milk; Example 2 depicts the usage behavior a second consumer whose purchase intervals are about twice as long as an expected purchase interval for milk; Example 3 depicts the usage behavior of a third consumer who changes their usage behavior after several purchase intervals; Example 4 depicts the usage behavior of a fourth consumer who occasionally purchases milk on at shorter intervals (e.g., for special events); and Example 5 depicts the usage behavior of a fifth consumer whose purchase intervals are about half as long as an expected purchase interval for milk. Examples 6 and 7 illustrate how the usage pattern component factors quantity purchased into the purchase propensity calculation.

Example 1

The following table (Table 1) depicts how the usage pattern component of the ESR implements the usage pattern algorithm, which accounts for the unique usage behavior of a first consumer, to automatically load the first consumer's virtual shopping cart with, in this example, a gallon of milk. In addition, the usage pattern algorithm used to generate the values in Table 1 employed $N_{average}$, or a moving average to describe the first consumer's current need over a total of 10 purchase intervals. Table 1 shows how the usage pattern algorithm behaves when n=3, 5, and 10. In this example, the default half-life of milk is assigned as 7 days. Accordingly $H_{milk}$ is about 0.9057 (see Equation 3).

TABLE 1

| Purchase Propensity of a First Consumer using Moving Average Need | | | | | | | |
|---|---|---|---|---|---|---|---|
| Purchase Interval (Days) | $N_{interval}$ ("current need") | Moving $N_{average}$ (n = 3) | $P_{milk, 3}$ (Purchase Propensity) | Moving $N_{average}$ (n = 5) | $P_{milk, 5}$ (Purchase Propensity) | Moving $N_{average}$ (n = 10) | $P_{milk, 10}$ (Purchase Propensity) |
| 6 | 0.55204476 | 0.5 | 0.31 | 0.5 | 0.31 | 0.5 | 0.31 |
| 7 | 0.5 | 0.52602238 | 0.60* | 0.52602238 | 0.60* | 0.52602238 | 0.60* |
| 8 | 0.45286183 | 0.51734825 | 0.72* | 0.51734825 | 0.72* | 0.51734825 | 0.72* |
| 9 | 0.41016768 | 0.50163553 | 0.80* | 0.50122665 | 0.80* | 0.50122665 | 0.80* |
| 5 | 0.60950683 | 0.45434317 | 0.09 | 0.48301485 | 0.13 | 0.48301485 | 0.13 |
| 6 | 0.55204476 | 0.49084545 | 0.29 | 0.50491622 | 0.33 | 0.50409685 | 0.33 |
| 7 | 0.5 | 0.52390642 | 0.59* | 0.50491622 | 0.52* | 0.51094655 | 0.54* |
| 6 | 0.55204476 | 0.55385053 | 0.51* | 0.50491622 | 0.33 | 0.50957823 | 0.35 |
| 8 | 0.45286183 | 0.5346965 | 0.77* | 0.5247528 | 0.75* | 0.51429673 | 0.72* |
| 6 | 0.55204476 | 0.50163553 | 0.32 | 0.53329163 | 0.43 | 0.50815324 | 0.34 |

*= milk added to shopping cart

The first consumer's purchase intervals are close to "expected" purchase intervals. In other words, the first consumer uses and purchases milk at intervals that are about the product's default half-life. It may be expected, then, that if the current interval is at or above about 7 days, the first consumer is likely to purchase milk in their next purchase on the smart refrigerator, but if the current interval is less than 7 days, it is less likely that the first consumer will purchase milk in their next purchase. In Table 1, the values in the purchase propensity $P_{milk}$ columns are calculated using the moving $N_{average}$ values in the column directly to the left. A value shown with an * asterisk indicates that the ESR is configured to add milk to the first consumer's shopping cart at such an interval. In this example, for any $P_{milk}$ greater than or equal to 0.5, the ESR is configured to add milk to the first consumer's virtual shopping cart.

For many intervals shown, whether n=3, 5, or 10, generally $P_{milk}$ is fairly similar, triggering the addition of milk into the virtual shopping cart during all of the same intervals, except one. For the eighth purchase interval, $P_{milk,3}$ for a moving average need with n=3 triggered the addition of milk to the virtual shopping cart even though the interval was only 6 days. This may indicate that using a value of n that is greater than 3, for a moving average need, may prove more useful, potentially avoiding early addition of products into the cart.

The usage pattern algorithm used to generate the values in Table 2 employed $N_{median}$, or used a "moving median" to describe the first consumer's current need over the 10 purchase intervals as shown in Table 1. Table 2 shows how the usage pattern algorithm behaves when n=3, 5, and 10.

ninth intervals using all six variations of the usage pattern algorithm (the three variations shown in Table 1 and the three variations shown in Table 2). However, the algorithm using $N_{median}$ for n=3 also triggered the addition of the milk to the cart for a purchase interval of 6 days (the eighth interval shown in Table 2), and the same occurred using $N_{median}$ for n=5 days for a purchase interval of 6 days (the tenth interval shown in Table 2).

According to the results of Table 1 and Table 2, the usage pattern algorithm may encourage "over-estimation" of purchase propensity at certain intervals, or adding a product to a cart before the consumer may wish to purchase the product. Accordingly, the first consumer may wish to adjust the threshold $P_{milk}$ value to, for example, 0.52, which would eliminate the "false positives" shown in both Tables 1 and 2. Alternatively, the first consumer may manually remove the milk from their virtual shopping cart, and the ESR may learn from such removal to adjust the threshold $P_{milk}$ without direct instruction from the first consumer.

Example 2

The following table (Table 3) depicts how the usage pattern component of the ESR implements the usage pattern algorithm, which accounts for the unique usage behavior of a second consumer with longer than expected purchase intervals. The usage pattern algorithm used to generate the values in Table 3 employed $N_{average}$, or a moving average to describe the second consumer's current need over a total of 10 purchase intervals. Table 3 shows how the usage pattern

TABLE 2

Purchase Propensity of the First Consumer using Moving Median Need

| Purchase Interval (Days) | $N_{interval}$ ("current need") | Moving $N_{median}$ (n = 3) | $P_{milk,3}$ (Purchase Propensity) | Moving $N_{median}$ (n = 5) | $P_{milk,5}$ (Purchase Propensity) | Moving $N_{median}$ (n = 10) | $P_{milk,10}$ (Purchase Propensity) |
|---|---|---|---|---|---|---|---|
| 6 | 0.55204476 | 0.5 | 0.31 | 0.5 | 0.31 | 0.5 | 0.31 |
| 7 | 0.5 | 0.52602238 | 0.60* | 0.52602238 | 0.60* | 0.52602238 | 0.60* |
| 8 | 0.45286183 | 0.5 | 0.67* | 0.5 | 0.67* | 0.5 | 0.67* |
| 9 | 0.41016768 | 0.5 | 0.80* | 0.5 | 0.80* | 0.5 | 0.80* |
| 5 | 0.60950683 | 0.45286183 | 0.09 | 0.5 | 0.16 | 0.5 | 0.16 |
| 6 | 0.55204476 | 0.45286183 | 0.18 | 0.5 | 0.31 | 0.5 | 0.31 |
| 7 | 0.5 | 0.55204476 | 0.69* | 0.5 | 0.50* | 0.5 | 0.50* |
| 6 | 0.55204476 | 0.55204476 | 0.50* | 0.5 | 0.31 | 0.5 | 0.31 |
| 8 | 0.45286183 | 0.55204476 | 0.82* | 0.55204476 | 0.82* | 0.5 | 0.67* |
| 6 | 0.55204476 | 0.5 | 0.31 | 0.55204476 | 0.50* | 0.5 | 0.31 |

*= milk added to shopping cart

The $P_{milk}$ results are similar to those of Table 1. The ESR triggers the addition of milk to the first consumer's virtual shopping cart during the second, third, fourth, seventh, and ninth intervals using all six variations of the usage pattern algorithm behaves when n=3, 5, and 10. In this example, the default half-life of milk is assigned as 7 days. Accordingly $H_{milk}$ is about 0.9057 (see Equation 3).

TABLE 3

Purchase Propensity of a Second Consumer using Moving Average Need

| Purchase Interval (Days) | $N_{interval}$ ("current need") | Moving $N_{average}$ (n = 3) | $P_{milk,3}$ (Purchase Propensity) | Moving $N_{average}$ (n = 5) | $P_{milk,5}$ (Purchase Propensity) | Moving $N_{average}$ (n = 10) | $P_{milk,10}$ (Purchase Propensity) |
|---|---|---|---|---|---|---|---|
| 12 | 0.30475341 | 0.5 | 0.95* | 0.5 | 0.95* | 0.5 | 0.95* |
| 14 | 0.25 | 0.40237671 | 0.91* | 0.40237671 | 0.91* | 0.40237671 | 0.91* |
| 16 | 0.20508384 | 0.35158447 | 0.90* | 0.35158447 | 0.90* | 0.35158447 | 0.90* |
| 18 | 0.16823752 | 0.25327908 | 0.78* | 0.31495931 | 0.90* | 0.31495931 | 0.90* |
| 10 | 0.37149857 | 0.20777379 | 0.08 | 0.28561496 | 0.22 | 0.28561496 | 0.22 |
| 12 | 0.30475341 | 0.24827331 | 0.30 | 0.25991467 | 0.34 | 0.29992889 | 0.48 |
| 14 | 0.25 | 0.2814965 | 0.62* | 0.25991467 | 0.54* | 0.30061811 | 0.68* |
| 12 | 0.30475341 | 0.30875066 | 0.51* | 0.25991467 | 0.34 | 0.29429085 | 0.46 |

TABLE 3-continued

Purchase Propensity of a Second Consumer using Moving Average Need

| Purchase Interval (Days) | $N_{interval}$ ("current need") | Moving $N_{average}$ (n = 3) | $P_{milk, 3}$ (Purchase Propensity) | Moving $N_{average}$ (n = 5) | $P_{milk, 5}$ (Purchase Propensity) | Moving $N_{average}$ (n = 10) | $P_{milk, 10}$ (Purchase Propensity) |
|---|---|---|---|---|---|---|---|
| 16 | 0.20508384 | 0.28650228 | 0.77* | 0.27984858 | 0.75* | 0.29545335 | 0.80* |
| 12 | 0.30475341 | 0.25327908 | 0.32 | 0.28721785 | 0.43 | 0.2864164 | 0.43 |

*= milk added to shopping cart

For the second consumer with long purchase intervals, about twice the default half-life of 7 days for milk, the usage pattern algorithm takes about four intervals to adjust. Where the moving average includes n=5 or 10 purchase intervals, the results for the fourth interval of 18 days appear more accurate. Though the algorithm still triggered the addition of milk to the cart when taking into account only n=3 purchase intervals, $P_{milk}$ should have been higher (as is seen for $P_{milk,5}$ and $P_{milk,10}$). Again, using more purchase intervals in the calculation appears to avoid further "false positives," as shown for the eighth interval of 12 days, in which using n=5 or 10 purchase intervals did not trigger adding milk, but using n=3 purchase intervals did.

The usage pattern algorithm used to generate the values in Table 4 employed $N_{median}$, or used a "moving median" to describe the second consumer's current need over the 10 purchase intervals as shown in Table 3. Table 4 shows how the usage pattern algorithm behaves when n=3, 5, and 10.

TABLE 4

Purchase Propensity of the Second Consumer using Moving Median Need

| Purchase Interval (Days) | $N_{interval}$ ("current need") | Moving $N_{median}$ (n = 3) | $P_{milk, 3}$ (Purchase Propensity) | Moving $N_{median}$ (n = 5) | $P_{milk, 5}$ (Purchase Propensity) | Moving $N_{median}$ (n = 10) | $P_{milk, 10}$ (Purchase Propensity) |
|---|---|---|---|---|---|---|---|
| 12 | 0.30475341 | 0.5 | 0.95* | 0.5 | 0.95* | 0.5 | 0.95* |
| 14 | 0.25 | 0.40237671 | 0.91* | 0.40237671 | 0.91* | 0.40237671 | 0.91* |
| 16 | 0.20508384 | 0.30475341 | 0.82* | 0.30475341 | 0.82* | 0.30475341 | 0.82* |
| 18 | 0.16823752 | 0.25 | 0.77* | 0.27737671 | 0.84* | 0.27737671 | 0.84* |
| 10 | 0.37149857 | 0.20508384 | 0.08 | 0.25 | 0.14 | 0.25 | 0.14 |
| 12 | 0.30475341 | 0.20508384 | 0.18 | 0.25 | 0.31 | 0.27737671 | 0.40 |
| 14 | 0.25 | 0.30475341 | 0.70* | 0.25 | 0.5* | 0.30475341 | 0.70* |
| 12 | 0.30475341 | 0.30475341 | 0.50* | 0.25 | 0.31 | 0.27737671 | 0.40 |
| 16 | 0.20508384 | 0.30475341 | 0.82* | 0.30475341 | 0.82* | 0.30475341 | 0.82* |
| 12 | 0.30475341 | 0.25 | 0.31 | 0.30475341 | 0.50* | 0.27737671 | 0.40 |

*= milk added to shopping cart

As shown above with respect to Example 1, the usage pattern algorithm may encourage "over-estimation" of purchase propensity at certain intervals. Accordingly, the second consumer may manually remove the milk from their shopping cart during intervals of 12 days (or when the second consumer does not yet wish to purchase milk), and the ESR may learn from such removal to adjust the threshold to, for example, 0.52, without direct instruction from the second consumer. Alternatively, the ESR may default to a threshold $P_{milk}$ of 0.51 or 0.52 if the usage pattern algorithm employs $N_{median}$, rather than $N_{average}$.

Example 3

The following table (Table 5) depicts how the usage pattern component of the ESR implements the usage pattern algorithm, which accounts for the unique usage behavior of a third consumer with purchase intervals that double in length after 15 purchase intervals. The usage pattern algorithm used to generate the values in Table 5 employed $N_{average}$, or a moving average to describe the third consumer's current need over a total of 25 purchase intervals. Table 5 shows how the usage pattern algorithm behaves when n=3, 5, and 10. In this example, the default half-life of milk is assigned as 7 days. Accordingly $H_{milk}$ is about 0.9057 (see Equation 3).

TABLE 5

Purchase Propensity of a Third Consumer using Moving Average Need

| Purchase Interval (Days) | $N_{interval}$ ("current need") | Moving $N_{average}$ (n = 3) | $P_{milk, 3}$ (Purchase Propensity) | Moving $N_{average}$ (n = 5) | $P_{milk, 5}$ (Purchase Propensity) | Moving $N_{average}$ (n = 10) | $P_{milk, 10}$ (Purchase Propensity) |
|---|---|---|---|---|---|---|---|
| 6 | 0.55204476 | 0.5 | 0.31 | 0.5 | 0.31 | 0.501226647 | 0.31 |
| 7 | 0.5 | 0.52602238 | 0.60* | 0.52602238 | 0.60* | 0.483014853 | 0.60* |
| 8 | 0.45286183 | 0.51734825 | 0.72* | 0.51734825 | 0.72* | 0.504096849 | 0.72* |
| 9 | 0.41016768 | 0.50163553 | 0.80* | 0.50122665 | 0.80* | 0.51094655 | 0.80* |
| 5 | 0.60950683 | 0.45434317 | 0.09 | 0.48301485 | 0.13 | 0.509578231 | 0.13 |
| 6 | 0.55204476 | 0.49084545 | 0.29 | 0.50491622 | 0.33 | 0.514296734 | 0.33 |
| 7 | 0.5 | 0.52390642 | 0.59* | 0.50491622 | 0.52* | 0.508153244 | 0.54* |

TABLE 5-continued

Purchase Propensity of a Third Consumer using Moving Average Need

| Purchase Interval (Days) | $N_{interval}$ ("current need") | Moving $N_{average}$ (n = 3) | $P_{milk, 3}$ (Purchase Propensity) | Moving $N_{average}$ (n = 5) | $P_{milk, 5}$ (Purchase Propensity) | Moving $N_{average}$ (n = 10) | $P_{milk, 10}$ (Purchase Propensity) |
|---|---|---|---|---|---|---|---|
| 6 | 0.55204476 | 0.55385053 | 0.51* | 0.50491622 | 0.33 | 0.51335772 | 0.35 |
| 8 | 0.45286183 | 0.5346965 | 0.77* | 0.5247528 | 0.75* | 0.508153244 | 0.72* |
| 6 | 0.55204476 | 0.50163553 | 0.32 | 0.53329163 | 0.43 | 0.503439427 | 0.34 |
| 7 | 0.5 | 0.51898378 | 0.57* | 0.52179922 | 0.58* | 0.499170012 | 0.55* |
| 8 | 0.45286183 | 0.50163553 | 0.68* | 0.51139027 | 0.71* | 0.519103927 | 0.70* |
| 9 | 0.41016768 | 0.50163553 | 0.80* | 0.50196264 | 0.80* | 0.51335772 | 0.80* |
| 5 | 0.60950683 | 0.45434317 | 0.09 | 0.47358722 | 0.12 | 0.488628585 | 0.16 |
| 6 | 0.55204476 | 0.49084545 | 0.29 | 0.50491622 | 0.33 | 0.459136969 | 0.38 |
| 12 | 0.30475341 | 0.52390642 | 0.96* | 0.50491622 | 0.95* | 0.420756246 | 0.96* |
| 16 | 0.20508384 | 0.48876833 | 0.99* | 0.4658669 | 0.98* | 0.41261992 | 0.99* |
| 18 | 0.16823752 | 0.35396067 | 0.94* | 0.4163113 | 0.98* | 0.387890786 | 0.99* |
| 10 | 0.37149857 | 0.22602493 | 0.10 | 0.36792527 | 0.49 | 0.362890786 | 0.68* |
| 12 | 0.30475341 | 0.24827331 | 0.30 | 0.32032362 | 0.56* | 0.348079944 | 0.83* |
| 14 | 0.25 | 0.2814965 | 0.62* | 0.27086535 | 0.58* | 0.32757156 | 0.89* |
| 12 | 0.30475341 | 0.30875066 | 0.51* | 0.25991467 | 0.34 | 0.297096219 | 0.71* |
| 16 | 0.20508384 | 0.28650228 | 0.77* | 0.27984858 | 0.75* | 0.501226647 | 0.90* |
| 12 | 0.30475341 | 0.25327908 | 0.32 | 0.28721785 | 0.43 | 0.483014853 | 0.58* |
| 14 | 0.25 | 0.27153022 | 0.58 | 0.27386882 | 0.59* | 0.504096849 | 0.67* |

*= milk added to shopping cart

The results in Table 5 indicate that, in at least some cases, using n=10 purchase intervals may decrease the flexibility of the usage pattern algorithm. Although using n=10 for the algorithm produces similar results for consistent usage behavior, it takes over 5 purchase intervals to adjust to the doubled intervals of the third consumer with n=10, whereas using n=3 or 5 allows the algorithm to adjust in about three purchase intervals, as the new usage behavior may dominate the calculations in the algorithm.

The usage pattern algorithm used to generate the values in Table 6 employed $N_{median}$, or used a "moving median" to describe the third consumer's current need over the 25 purchase intervals as shown in Table 5. Table 6 shows how the usage pattern algorithm behaves when n=3, 5, and 10.

TABLE 6

Purchase Propensity of the Third Consumer using Moving Median Need

| Purchase Interval (Days) | $N_{interval}$ ("current need") | Moving $N_{median}$ (n = 3) | $P_{milk, 3}$ (Purchase Propensity) | Moving $N_{median}$ (n = 5) | $P_{milk, 5}$ (Purchase Propensity) | Moving $N_{median}$ (n = 10) | $P_{milk, 10}$ (Purchase Propensity) |
|---|---|---|---|---|---|---|---|
| 6 | 0.55204476 | 0.5 | 0.31 | 0.5 | 0.31 | 0.5 | 0.31 |
| 7 | 0.5 | 0.52602238 | 0.60* | 0.52602238 | 0.60* | 0.52602238 | 0.60* |
| 8 | 0.45286183 | 0.5 | 0.67* | 0.5 | 0.67* | 0.5 | 0.67* |
| 9 | 0.41016768 | 0.5 | 0.79* | 0.5 | 0.79* | 0.5 | 0.79* |
| 5 | 0.60950683 | 0.45286183 | 0.09 | 0.5 | 0.16* | 0.5 | 0.16 |
| 6 | 0.55204476 | 0.45286183 | 0.18 | 0.5 | 0.31 | 0.5 | 0.31 |
| 7 | 0.5 | 0.55204476 | 0.69* | 0.5 | 0.50* | 0.5 | 0.50* |
| 6 | 0.55204476 | 0.55204476 | 0.50* | 0.5 | 0.31 | 0.5 | 0.31 |
| 8 | 0.45286183 | 0.55204476 | 0.82* | 0.55204476 | 0.82* | 0.5 | 0.67* |
| 6 | 0.55204476 | 0.5 | 0.31 | 0.55204476 | 0.50* | 0.5 | 0.31 |
| 7 | 0.5 | 0.55204476 | 0.69* | 0.55204476 | 0.69* | 0.52602238 | 0.60* |
| 8 | 0.45286183 | 0.5 | 0.67* | 0.5 | 0.67* | 0.5 | 0.67* |
| 9 | 0.41016768 | 0.5 | 0.79* | 0.5 | 0.79* | 0.5 | 0.79* |
| 5 | 0.60950683 | 0.45286183 | 0.09 | 0.45286183 | 0.09 | 0.5 | 0.16 |
| 6 | 0.55204476 | 0.45286183 | 0.18 | 0.5 | 0.31 | 0.52602238 | 0.40 |
| 12 | 0.30475341 | 0.58077579 | 0.98* | 0.50245329 | 0.95* | 0.5 | 0.95* |
| 16 | 0.20508384 | 0.42839909 | 0.97* | 0.48110622 | 0.98* | 0.5 | 0.99* |
| 18 | 0.16823752 | 0.25491863 | 0.79* | 0.42839909 | 0.98* | 0.45286183 | 0.99* |
| 10 | 0.37149857 | 0.20508384 | 0.08 | 0.25491863 | 0.15 | 0.45286183 | 0.77* |
| 12 | 0.30475341 | 0.20508384 | 0.18 | 0.25491863 | 0.32 | 0.41016768 | 0.83* |
| 14 | 0.25 | 0.30475341 | 0.69* | 0.30475341 | 0.69* | 0.37149857 | 0.86* |
| 12 | 0.30475341 | 0.30475341 | 0.50* | 0.25 | 0.31 | 0.30475341 | 0.50* |
| 16 | 0.20508384 | 0.30475341 | 0.82* | 0.30475341 | 0.82* | 0.30475341 | 0.82* |
| 12 | 0.30475341 | 0.25 | 0.31 | 0.30475341 | 0.50* | 0.30475341 | 0.50* |
| 14 | 0.25 | 0.30475341 | 0.69* | 0.30475341 | 0.69* | 0.30475341 | 0.69* |

*= milk added to shopping cart

Similar to the discussion above with respect to Table 5, as shown in Table 6, in at least some cases, using n=10 purchase intervals may decrease the flexibility of the usage pattern algorithm. It takes over 5 purchase intervals to adjust to the doubled intervals of the third consumer with n=10, whereas using n=3 or 5 allows the algorithm to adjust in about three purchase intervals.

Accordingly, in one example embodiment, the usage pattern algorithm may default to using n=5, whether for the variable $N_{average}$ or $N_{median}$) as using five purchase intervals appears to allow flexibility of the algorithm to changing behaviors and may also avoid an overabundance of false positives.

Example 4

The following table (Table 7) depicts how the usage pattern component of the ESR implements the usage pattern algorithm, which accounts for the unique usage behavior of a fourth consumer with two unusually short purchase intervals (e.g., for a special event). The usage pattern algorithm used to generate the values in Table 7 employed $N_{average}$, or a moving average to describe the fourth consumer's current need over a total of 20 purchase intervals. Table 7 shows how the usage pattern algorithm behaves when n=3, 5, and 10. In this example, the default half-life of milk is assigned as 7 days. Accordingly $H_{milk}$ is about 0.9057 (see Equation 3).

TABLE 7

Purchase Propensity of a Fourth Consumer using Moving Average Need

| Purchase Interval (Days) | $N_{interval}$ ("current need") | Moving $N_{average}$ (n = 3) | $P_{milk, 3}$ (Purchase Propensity) | Moving $N_{average}$ (n = 5) | $P_{milk, 5}$ (Purchase Propensity) | Moving $N_{average}$ (n = 10) | $P_{milk, 10}$ (Purchase Propensity) |
|---|---|---|---|---|---|---|---|
| 6 | 0.55204476 | 0.5 | 0.31 | 0.5 | 0.31 | 0.5 | 0.31 |
| 7 | 0.5 | 0.52602238 | 0.60* | 0.52602238 | 0.60* | 0.52602238 | 0.60* |
| 8 | 0.45286183 | 0.51734825 | 0.72* | 0.51734825 | 0.72* | 0.51734825 | 0.72* |
| 9 | 0.41016768 | 0.50163553 | 0.80* | 0.50122665 | 0.80* | 0.50122665 | 0.80* |
| 5 | 0.60950683 | 0.45434317 | 0.09 | 0.48301485 | 0.13 | 0.48301485 | 0.13 |
| 6 | 0.55204476 | 0.49084545 | 0.29 | 0.50491622 | 0.33 | 0.50409685 | 0.33 |
| 7 | 0.5 | 0.52390642 | 0.59* | 0.50491622 | 0.52* | 0.51094655 | 0.54* |
| 6 | 0.55204476 | 0.55385053 | 0.51* | 0.50491622 | 0.33 | 0.50957823 | 0.35 |
| 8 | 0.45286183 | 0.5346965 | 0.77* | 0.5247528 | 0.75* | 0.51429673 | 0.72* |
| 6 | 0.55204476 | 0.50163553 | 0.32 | 0.53329163 | 0.43 | 0.50815324 | 0.34 |
| 7 | 0.5 | 0.51898378 | 0.57* | 0.52179922 | 0.58* | 0.51335772 | 0.55* |
| 2** | 0.82033536 | 0.50163553 | 0.01 | 0.51139027 | 0.01 | 0.50815324 | 0.01 |
| 3** | 0.74299714 | 0.6241267 | 0.14 | 0.57545734 | 0.07 | 0.54018678 | 0.05 |
| 5 | 0.60950683 | 0.6877775 | 0.76* | 0.61364782 | 0.52* | 0.56920031 | 0.35 |
| 6 | 0.55204476 | 0.72427978 | 0.93* | 0.64497682 | 0.80* | 0.58913423 | 0.64* |
| 7 | 0.5 | 0.63484958 | 0.88* | 0.64497682 | 0.90* | 0.58338802 | 0.78* |
| 6 | 0.55204476 | 0.55385053 | 0.51* | 0.64497682 | 0.80* | 0.57818354 | 0.60* |
| 8 | 0.45286183 | 0.5346965 | 0.77* | 0.5913187 | 0.89* | 0.58338802 | 0.88* |
| 9 | 0.41016768 | 0.50163553 | 0.80* | 0.53329163 | 0.86* | 0.57346973 | 0.92* |
| 5 | 0.60950683 | 0.47169142 | 0.11 | 0.4934238 | 0.15 | 0.56920031 | 0.35 |

*= milk added to shopping cart
**= shorter interval

The usage pattern algorithm used to generate the values in Table 8 below employed $N_{median}$, or used a "moving median" to describe the fourth consumer's current need over the 20 purchase intervals as shown in Table 7. Table 8 shows how the usage pattern algorithm behaves when n=3, 5, and 10.

TABLE 8

Purchase Propensity of the Fourth Consumer using Moving Median Need

| Purchase Interval (Days) | $N_{interval}$ ("current need") | Moving $N_{median}$ (n = 3) | $P_{milk, 3}$ (Purchase Propensity) | Moving $N_{median}$ (n = 5) | $P_{milk, 5}$ (Purchase Propensity) | Moving $N_{median}$ (n = 10) | $P_{milk, 10}$ (Purchase Propensity) |
|---|---|---|---|---|---|---|---|
| 6 | 0.55204476 | 0.5 | 0.31 | 0.5 | 0.31 | 0.5 | 0.31 |
| 7 | 0.5 | 0.52602238 | 0.60* | 0.52602238 | 0.60* | 0.52602238 | 0.60* |
| 8 | 0.45286183 | 0.5 | 0.67* | 0.5 | 0.67* | 0.5 | 0.67* |
| 9 | 0.41016768 | 0.5 | 0.79* | 0.5 | 0.79* | 0.5 | 0.79* |
| 5 | 0.60950683 | 0.45286183 | 0.09 | 0.5 | 0.16 | 0.5 | 0.16 |
| 6 | 0.55204476 | 0.45286183 | 0.18 | 0.5 | 0.31 | 0.5 | 0.31 |
| 7 | 0.5 | 0.55204476 | 0.69* | 0.5 | 0.50* | 0.5 | 0.50* |
| 6 | 0.55204476 | 0.55204476 | 0.50* | 0.5 | 0.31 | 0.5 | 0.31 |
| 8 | 0.45286183 | 0.55204476 | 0.82* | 0.55204476 | 0.82* | 0.5 | 0.67* |
| 6 | 0.55204476 | 0.5 | 0.31 | 0.55204476 | 0.50* | 0.5 | 0.31 |
| 7 | 0.5 | 0.55204476 | 0.69* | 0.55204476 | 0.69* | 0.52602238 | 0.60* |
| 2** | 0.82033536 | 0.5 | 0.01 | 0.5 | 0.01 | 0.5 | 0.01 |
| 3** | 0.74299714 | 0.55204476 | 0.05 | 0.55204476 | 0.05 | 0.52602238 | 0.04 |
| 5 | 0.60950683 | 0.74299714 | 0.88* | 0.55204476 | 0.30 | 0.55204476 | 0.30 |
| 6 | 0.55204476 | 0.74299714 | 0.95* | 0.60950683 | 0.70* | 0.55204476 | 0.50* |
| 7 | 0.5 | 0.60950683 | 0.84* | 0.60950683 | 0.84* | 0.55204476 | 0.69* |
| 6 | 0.55204476 | 0.55204476 | 0.50* | 0.60950683 | 0.70* | 0.55204476 | 0.50* |
| 8 | 0.45286183 | 0.55204476 | 0.82* | 0.55204476 | 0.82* | 0.55204476 | 0.82* |
| 9 | 0.41016768 | 0.5 | 0.79* | 0.55204476 | 0.89* | 0.55204476 | 0.89* |
| 5 | 0.60950683 | 0.45286183 | 0.09 | 0.5 | 0.16 | 0.55204476 | 0.30 |

*= milk added to shopping cart
**= shorter interval

In at least some cases, using a moving or rolling median may enable the usage pattern algorithm to be more flexible than using a moving average. Based on the mathematical properties of a median, especially in cases where n>3, the shorter, anomalous purchase intervals do not outweigh the usual usage pattern.

Example 5

The following table (Table 9) depicts how the usage pattern component of the ESR implements the usage pattern algorithm, which accounts for the unique usage behavior of a fifth consumer with purchase intervals that are shorter (e.g., about half as long) as expected purchase intervals for the product. The usage pattern algorithm used to generate the values in Table 9 employed $N_{average}$, or a moving average to describe the fifth consumer's current need over a total of 10 purchase intervals. Table 9 shows how the usage pattern algorithm behaves when n=3, 5, and 10. In this example, the default half-life of milk is assigned as 7 days. Accordingly $H_{milk}$ is about 0.9057 (see Equation 3).

TABLE 9

Purchase Propensity of a Fifth Consumer using Moving Average Need

| Purchase Interval (Days) | $N_{interval}$ ("current need") | Moving $N_{average}$ (n = 3) | $P_{milk, 3}$ (Purchase Propensity) | Moving $N_{average}$ (n = 5) | $P_{milk, 5}$ (Purchase Propensity) | Moving $N_{average}$ (n = 10) | $P_{milk, 10}$ (Purchase Propensity) |
|---|---|---|---|---|---|---|---|
| 3   | 0.74299714 | 0.5        | 0.03  | 0.5        | 0.03  | 0.5        | 0.03  |
| 3.5 | 0.70710678 | 0.62149857 | 0.22  | 0.62149857 | 0.22  | 0.62149857 | 0.22  |
| 4   | 0.6729501  | 0.65003464 | 0.41  | 0.65003464 | 0.41  | 0.65003464 | 0.41  |
| 4.5 | 0.64044334 | 0.70768467 | 0.73* | 0.65576351 | 0.56* | 0.65576351 | 0.56* |
| 2.5 | 0.78070918 | 0.67350007 | 0.17  | 0.65269947 | 0.13  | 0.65269947 | 0.13  |
| 3   | 0.74299714 | 0.69803421 | 0.34  | 0.70884131 | 0.37  | 0.67403442 | 0.26  |
| 3.5 | 0.70710678 | 0.72138322 | 0.55* | 0.70884131 | 0.51* | 0.68388624 | 0.41  |
| 3   | 0.74299714 | 0.74360437 | 0.50* | 0.70884131 | 0.37  | 0.68678881 | 0.30  |
| 4   | 0.6729501  | 0.73103369 | 0.71* | 0.72285072 | 0.68* | 0.69303418 | 0.57* |
| 3   | 0.74299714 | 0.70768467 | 0.37  | 0.72935207 | 0.45  | 0.69102577 | 0.31  |

*= milk added to shopping cart

In the example involving the fifth consumer, in general, if a current interval is greater than 3.5 days, it may be assumed that the fifth consumer is likely to purchase milk during their next purchase. If the current interval is fewer than 3.5 days, it may be assumed that the fifth consumer is not likely to purchase milk during their next purchase. The usage pattern algorithm using $N_{average}$ takes about four cycles to adjust to the unique purchase patterns (i.e., the shortened purchase intervals) of the fifth consumer.

The usage pattern algorithm used to generate the values in Table 10 below employed $N_{median}$, or used a "moving median" to describe the fifth consumer's current need over the 10 purchase intervals as shown in Table 9. Table 10 shows how the usage pattern algorithm behaves when n=3, 5, and 10.

TABLE 10

Purchase Propensity of the Fifth Consumer using Moving Median Need

| Purchase Interval (Days) | $N_{interval}$ ("current need") | Moving $N_{median}$ (n = 3) | $P_{milk, 3}$ (Purchase Propensity) | Moving $N_{median}$ (n = 5) | $P_{milk, 5}$ (Purchase Propensity) | Moving $N_{median}$ (n = 10) | $P_{milk, 10}$ (Purchase Propensity) |
|---|---|---|---|---|---|---|---|
| 3   | 0.74299714 | 0.5        | 0.03  | 0.5        | 0.03  | 0.5        | 0.03  |
| 3.5 | 0.70710678 | 0.62149857 | 0.22  | 0.62149857 | 0.22  | 0.62149857 | 0.22  |
| 4   | 0.6729501  | 0.70710678 | 0.63* | 0.70710678 | 0.63* | 0.70710678 | 0.63* |
| 4.5 | 0.64044334 | 0.70710678 | 0.73* | 0.69002844 | 0.68* | 0.69002844 | 0.68* |
| 2.5 | 0.78070918 | 0.6729501  | 0.17  | 0.6729501  | 0.17  | 0.6729501  | 0.17  |
| 3   | 0.74299714 | 0.6729501  | 0.26  | 0.70710678 | 0.37  | 0.69002844 | 0.31  |
| 3.5 | 0.70710678 | 0.74299714 | 0.63* | 0.70710678 | 0.50* | 0.70710678 | 0.50* |
| 3   | 0.74299714 | 0.74299714 | 0.50* | 0.70710678 | 0.37  | 0.70710678 | 0.37  |
| 4   | 0.6729501  | 0.74299714 | 0.74* | 0.74299714 | 0.74* | 0.70710678 | 0.63* |
| 3   | 0.74299714 | 0.70710678 | 0.37  | 0.74299714 | 0.50* | 0.70710678 | 0.37  |

*= milk added to shopping cart

Based on the results of Tables 9 and 10, in at least some cases, using a median rather than an average allows the usage pattern algorithm to more quickly converge on the unique usage behavior of the fifth consumer, taking about three cycles as opposed to four.

Example 6

The following table (Table 11) depicts how the usage pattern component of the ESR implements the usage pattern algorithm to factor in an abnormal purchase of a different quantity of product. The usage pattern algorithm used to generate the values in Table 11 employed $N_{average}$, or a moving average to describe a consumer's current need over a total of 15 purchase intervals. Table 11 shows how the usage pattern algorithm behaves when n=3, 5, and 10. In this example, the default half-life of milk is assigned as 7 days. Accordingly $H_{milk}$ is about 0.9057 (see Equation 3).

TABLE 11

Purchase Propensity Factoring in Quantity using Moving Average Need

| Purchase Interval (Days) | Quantity/ Units | $N_{interval}$ ("current need") | Moving $N_{average}$ (n = 3) | $P_{milk, 3}$ (Purchase Propensity) | Moving $N_{average}$ (n = 5) | $P_{milk, 5}$ (Purchase Propensity) | Moving $N_{average}$ (n = 10) | $P_{milk, 10}$ (Purchase Propensity) |
|---|---|---|---|---|---|---|---|---|
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 0.5 | 0.5 | 0.5 | 0.50* | 0.5 | 0.50* | 0.5 | 0.50* |
| 7 | 1 | 0.25 | 0.5 | 0.98* | 0.5 | 0.98* | 0.5 | 0.98* |
| 7 | 1 | 0.5 | 0.416666667 | 0.22 | 0.4375 | 0.28 | 0.46875 | 0.38 |
| 7 | 1 | 0.5 | 0.416666667 | 0.22 | 0.4375 | 0.28 | 0.472222222 | 0.40 |
| 7 | 1 | 0.5 | 0.416666667 | 0.22 | 0.4375 | 0.28 | 0.472222222 | 0.40 |
| 7 | 1 | 0.5 | 0.5 | 0.50* | 0.4375 | 0.28 | 0.472222222 | 0.40 |
| 7 | 2 | 1 | 0.5 | 0.00 | 0.5 | 0.00 | 0.472222222 | 0.00 |
| 7 | 0 | 0 | 0.666666667 | 0.99* | 0.6 | 0.99* | 0.527777778 | 0.99* |
| 7 | 1 | 0.5 | 0.5 | 0.50* | 0.5 | 0.50* | 0.472222222 | 0.40 |

*= milk added to shopping cart

The usage pattern algorithm, using moving average need, takes several purchase intervals (between three intervals, for n=3, and five intervals, for n=10) to account for a single abnormal purchase of 0.5 gallons of milk (as opposed to the typical one gallon). However, the usage pattern algorithm quickly re-converges (within one or two purchase intervals) after two abnormal cycles in a row, first a purchase of two gallons then of none.

The usage pattern algorithm used to generate the values in Table 12 below employed $N_{median}$, or used a "moving median" to describe the consumer's current need over the 15 purchase intervals as shown in Table 11. Table 12 shows how the usage pattern algorithm behaves when n=3, 5, and 10.

TABLE 12

Purchase Propensity Factoring in Quantity using Moving Median Need

| Purchase Interval (Days) | Quantity/ Units | $N_{interval}$ ("current need") | Moving $N_{median}$ (n = 3) | $P_{milk, 3}$ (Purchase Propensity) | Moving $N_{median}$ (n = 5) | $P_{milk, 5}$ (Purchase Propensity) | Moving $N_{median}$ (n = 10) | $P_{milk, 10}$ (Purchase Propensity) |
|---|---|---|---|---|---|---|---|---|
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 0.5 | 0.5 | 0.5 | 0.50* | 0.5 | 0.50* | 0.5 | 0.50* |
| 7 | 1 | 0.25 | 0.5 | 0.98* | 0.5 | 0.98* | 0.5 | 0.98* |
| 7 | 1 | 0.5 | 0.5 | 0.50* | 0.5 | 0.50* | 0.5 | 0.50* |
| 7 | 1 | 0.5 | 0.375 | 0.13 | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 2 | 1 | 0.5 | 0.00 | 0.5 | 0.00 | 0.5 | 0.00 |
| 7 | 0 | 0 | 0.5 | 0.99* | 0.5 | 0.99* | 0.5 | 0.99* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |

*= milk added to shopping cart

The usage pattern algorithm, using moving median need, is nearly nonreactive to the single abnormal purchase of 0.5 gallons of milk. Only when n=3 is the algorithm affected (three cycles later). In addition, the usage pattern algorithm quickly re-converges (within one purchase interval) after two abnormal cycles in a row, first a purchase of two gallons then of none. Example 7

The following table (Table 13) depicts how the usage pattern component of the ESR implements the usage pattern algorithm to factor in a systematic change in the quantity of product purchased. The usage pattern algorithm used to generate the values in Table 13 employed $N_{average}$, or a moving average to describe a consumer's current need over a total of 15 purchase intervals. Table 13 shows how the usage pattern algorithm behaves when n=3, 5, and 10. In this example, the default half-life of milk is assigned as 7 days. Accordingly $H_{milk}$ is about 0.9057 (see Equation 3).

TABLE 13

Purchase Propensity Factoring in Quantity using Moving Average Need

| Purchase Interval (Days) | Quantity/ Units | $N_{interval}$ ("current need") | Moving $N_{average}$ (n = 3) | $P_{milk, 3}$ (Purchase Propensity) | Moving $N_{average}$ (n = 5) | $P_{milk, 5}$ (Purchase Propensity) | Moving $N_{average}$ (n = 10) | $P_{milk, 10}$ (Purchase Propensity) |
|---|---|---|---|---|---|---|---|---|
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 2 | 0.5 | 0.5 | 0.50* | 0.5 | 0.50* | 0.5 | 0.50* |
| 7 | 2 | 1 | 0.5 | 0.00 | 0.5 | 0.00 | 0.5 | 0.00 |
| 7 | 2 | 1 | 0.666666667 | 0.01 | 0.6 | 0.00 | 0.555555556 | 0.00 |
| 7 | 2 | 1 | 0.833333333 | 0.08 | 0.7 | 0.01 | 0.6 | 0.00 |
| 7 | 2 | 1 | 1 | 0.50* | 0.8 | 0.05 | 0.65 | 0.01 |
| 7 | 2 | 1 | 1 | 0.50* | 0.9 | 0.18 | 0.7 | 0.01 |
| 7 | 2 | 1 | 1 | 0.50* | 1 | 0.50* | 0.75 | 0.02 |
| 7 | 2 | 1 | 1 | 0.50* | 1 | 0.50* | 0.8 | 0.05 |

*= milk added to shopping cart

As in Example 6, the usage pattern algorithm using moving average need takes several purchase intervals (between three intervals, for n=3, and at least seven intervals, for n=10) to adjust to the new quantity of milk purchased.

The usage pattern algorithm used to generate the values in Table 14 below employed $N_{median}$, or used a "moving median" to describe the fifth consumer's current need over the 15 purchase intervals as shown in Table 14. Table 14 shows how the usage pattern algorithm behaves when n=3, 5, and 10.

TABLE 14

Purchase Propensity Factoring in Quantity using Moving Median Need

| Purchase Interval (Days) | Quantity/ Units | $N_{interval}$ ("current need") | Moving $N_{median}$ (n = 3) | $P_{milk, 3}$ (Purchase Propensity) | Moving $N_{median}$ (n = 5) | $P_{milk, 5}$ (Purchase Propensity) | Moving $N_{median}$ (n = 10) | $P_{milk, 10}$ (Purchase Propensity) |
|---|---|---|---|---|---|---|---|---|
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 1 | 0.5 | 0.5 | 0.50* | 0.5 | 0.50* | 0.5 | 0.50* |
| 7 | 2 | 0.5 | 0.5 | 0.50* | 0.5 | 0.50* | 0.5 | 0.50* |
| 7 | 2 | 1 | 0.5 | 0.00 | 0.5 | 0.00 | 0.5 | 0.00 |
| 7 | 2 | 1 | 0.5 | 0.00 | 0.5 | 0.00 | 0.5 | 0.00 |
| 7 | 2 | 1 | 1 | 0.50* | 0.5 | 0.00 | 0.5 | 0.00 |
| 7 | 2 | 1 | 1 | 0.50* | 1 | 0.50* | 0.5 | 0.00 |
| 7 | 2 | 1 | 1 | 0.50* | 1 | 0.50* | 0.5 | 0.00 |
| 7 | 2 | 1 | 1 | 0.50* | 1 | 0.50* | 0.75 | 0.02 |
| 7 | 2 | 1 | 1 | 0.50* | 1 | 0.50* | 1 | 0.50* |
| 7 | 1 | 0.5 | 1 | 0.50* | 1 | 0.50* | 1 | 0.50* |

*= milk added to shopping cart

The usage pattern algorithm, using moving median need as opposed to moving average need, takes fewer purchase interval to account for the new product quantity: two purchase intervals (as opposed to three) when n=3 up to six (as opposed to at least seven) when n=10.

Accordingly, taking into account all of the various examples described above, in the example embodiment, the usage pattern algorithm, as implemented by the usage pattern component of the ESR, employs $N_{median}$ wherein n=5. In alternative embodiments, other N and/or n values may be employed. Alternatively or additionally, the usage pattern algorithm may employ other N and/or n values in response to user input (e.g., a user manually adding or removing an item from the cart).

The methods and systems described herein may be implemented using computer programming or engineering techniques including computer software, firmware, hardware, or any combination or subset therefor. At least one of the technical problems addressed by this system includes: (i) conventional smart refrigerators lacking virtual shopping capability; (ii) inconvenience in online shopping systems in which users have to manually search for each and every product to add to their virtual shopping cart; (iii) increased processing requirements for users to manually search and populate their virtual shopping cart.

The technical effect of the systems and methods described herein is achieved by performing at least one of the following steps: (a) storing a purchase log within a memory, the purchase log including a purchase history of a target product; (b) determining a current interval between a most recent delivery date of the target product and a proposed next delivery date of the target product based on the purchase history of the target product; (c) calculating a purchase propensity for the target product based on the current interval and the purchase history of the target product; and/or (d) automatically adding the target product to the virtual shopping cart for submission to a party for purchase of the target product, if the purchase propensity meets a first criteria.

The resulting technical effect achieved is at least one of: (i) providing an enhanced smart refrigerator with online shopping capability included thereon; and (ii) said enhanced smart refrigerator including a usage pattern component that applies a predictive algorithm to automatically pre-populate a consumer's virtual shopping cart, saving the consumer time and effort as well as minimizing processing requirements for increased time and unnecessary user queries over the virtual shopping system.

In situations in which the virtual shopping system discussed herein collects personal information about users, or may make use of personal information, the users may be provided with an opportunity to control whether programs or features collect user information. In addition, certain data may be treated in one or more ways before it is stored or used, such that personally identifiable information is removed. For example, a user's identity may be treated so that no personally identifiable information can be determined for the user, or a user's geographic location may be generalized where location information is obtained (such as a city, a ZIP code, or state level), so that a particular location of a user cannot be determined. Thus, the user may have control over how information is collected about the user and used by the virtual shopping system.

In one embodiment, a computer program is provided, and the program is embodied on a computer-readable medium. In an example embodiment, the virtual shopping system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the virtual shopping system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing purchase patterns in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a block diagram of the virtual shopping system 100 including an enhanced smart refrigerator (ESR) 102 with usage pattern functionality. The virtual shopping system 100 also includes a merchant computing device 104 in communication with ESR 102. ESR 102 is illustrated in FIG. 1 as embodied in a smart refrigerator. However, in one or more alternative embodiments, ESR 102 may embodied on another smart appliance (e.g., an oven, a microwave, etc.) and/or a computing device integrated into and/or otherwise in communication with one or more components of a "smart kitchen" (e.g., a smart phone, tablet, desktop, laptop, and/or a dedicated "smart home" computing device). ESR 102 includes a processor 106 that is connected to a database (memory) 108 containing information on a variety of matters, as described below in greater detail. In one embodiment, database 108 is stored on ESR 102. In any alternative embodiment, database 108 is stored remotely from ESR 102 and may be non-centralized.

ESR 102 further includes a user interface 110 that facilitates user interaction with ESR 102. For example, user interface 110 enables a user to input information to ESR 102 and ESR 102 to output results to the user (e.g., on a display device of the user interface 110). ESR 102 is configured to connect to the Internet such that ESR 102 provides online shopping functionality to the user though user interface 110. In the illustrated embodiment, ESR 102 includes a front face or front wall 120 and at least two side faces or side walls 122 (only one of which is shown in FIG. 1). Front wall 120 includes a first door 124 and a second door 126. First door 124 may be a door to a refrigerator section (not shown), and second door 126 may be a door to a freezer section (not shown) of ESR 102. It should be understood that a variety of other door configurations are contemplated within the scope of the disclosure, including fewer doors or more doors, drawer faces rather than hinges doors, etc. For example, ESR 102 may include a three-door configuration featuring two "French doors" and a freezer drawer.

At least one of first door 124 and second door 126 includes a monitor 128 built into the door. Monitor 128 functions as user interface 110, and may include touch screen functionality. In some embodiments, monitor 128 may be built into one of side walls 122. Moreover, in some embodiments, ESR 102 may include more than one monitor 128 and/or other input/output components (e.g., a keyboard).

In the example embodiment, merchant computing device 104 is associated with a merchant (not shown). ESR 102 facilitates access to merchant computing device 104 through user interface 110, for example, for the user to access the virtual merchant capabilities of the merchant. ESR 102 can access merchant computing device 104 to access data (e.g., a product catalog associated with the merchant) and/or to access the virtual merchant capabilities of the merchant (e.g., the merchant's online store). In the example embodiment, merchant computing device 104 is a computer that includes a web browser or a software application, which enables ESR 102 to access the merchant's online store. More specifically, ESR 102 and/or merchant computing device 104 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Accordingly, in one embodiment, merchant computing device 104 may be any device capable of interconnecting to the Internet including a point-of-sale (POS) device a mobile computing device, such as a notebook computer, a web-based phone, a personal digital assistant (PDA), or other web-connectable equipment. Although only one merchant computing device 104 is shown in FIG. 1 for clarity, it should be understood that ESR 102 may be in communication with any number of merchant computing devices 104.

Accordingly, the user may make purchases from a merchant computing device 104 through user interface 110, such as purchases of groceries, healthcare items, and other household products, by adding the products to a virtual shopping cart and proceeding through a checkout process. The user may choose which products to purchase from a product catalog, which may be stored by ESR 102, for example, at database 108 or may be stored and/or maintained by merchant computing device 104 (either centrally or, for example, at database 108). The product catalog includes which products are for sale, the cost of those items, the merchant(s) from which they are available, and/or the quantity available. The product catalog may categorize the products according to a hierarchical ontology, such that products may be easily searched by the user and/or grouped together by like products. In addition, the product catalog may include a default half-life for each product, as described above. The default half-life may be assigned to each product by ESR 102 and/or merchant computing device 104.

ESR 102 is configured to store a purchase log of the user's purchases made on user interface 110. ESR 102 may store the purchase log, for example, at database 108. The purchase log may include a purchase history of one or more target products. More specifically, the purchase history may detail which products were purchased and when (e.g., on a particular date, day of the week, time of day, etc.), from which merchant(s), and the quantity of each product purchased. As the user continues to make purchases using user interface 110, ESR 102 logs the purchase interval, or the number of days (or hours, minutes, weeks, etc.) between sequential purchases. The purchase intervals are used to characterize the product usage and purchase behavior of each individual user. As described further herein, ESR 102 is configured to calculate a historical need for the product during each of the plurality of purchase intervals based on the default half-life, according the user's unique usage behavior. The default half-life is used an initial starting point to calculate an "initial need," but is quickly overruled in subsequent calculations by the user's actual usage behavior.

ESR 102 is further configured to use the stored and/or calculated data to determine whether the user is likely to have used a product between the date of a most recent purchase and a proposed next purchase (based on the historical need and the purchase intervals for that particular user). ESR 102 includes a usage pattern component 112 which executes a usage pattern algorithm, the output of which is a purchase propensity, which describes whether the user is likely to purchase the item during their next purchase—in other words, that the user has consumed the product and will need it again. If the purchase propensity meets a certain criteria (e.g., meets or exceeds a particular threshold, which may be set by ESR 102 and/or by the user), ESR 102 automatically adds the product to the user's virtual shopping cart, accessible to the user via user interface 110. Usage pattern component 112 may be implemented as an executable module of processor 106 and/or as a separate component, which may be integral to ESR 102 and/or connected thereto.

ESR 102 may be further configured to access merchant computing device 104 to determine an availability of a product added to the virtual shopping cart from the associated merchant. If ESR 102 determines that the product is not available, ESR 102 may be configured to remove the product from the virtual shopping cart and to add an alternate product to the virtual shopping cart, the alternate product being a different brand or a similar product. ESR 102 may be configured to add the alternate product to the virtual shopping cart as a recommendation or as a highlighted item, such that the user may agree to purchase the alternate product or may remove the alternate product from the virtual shopping cart.

Figure 2:
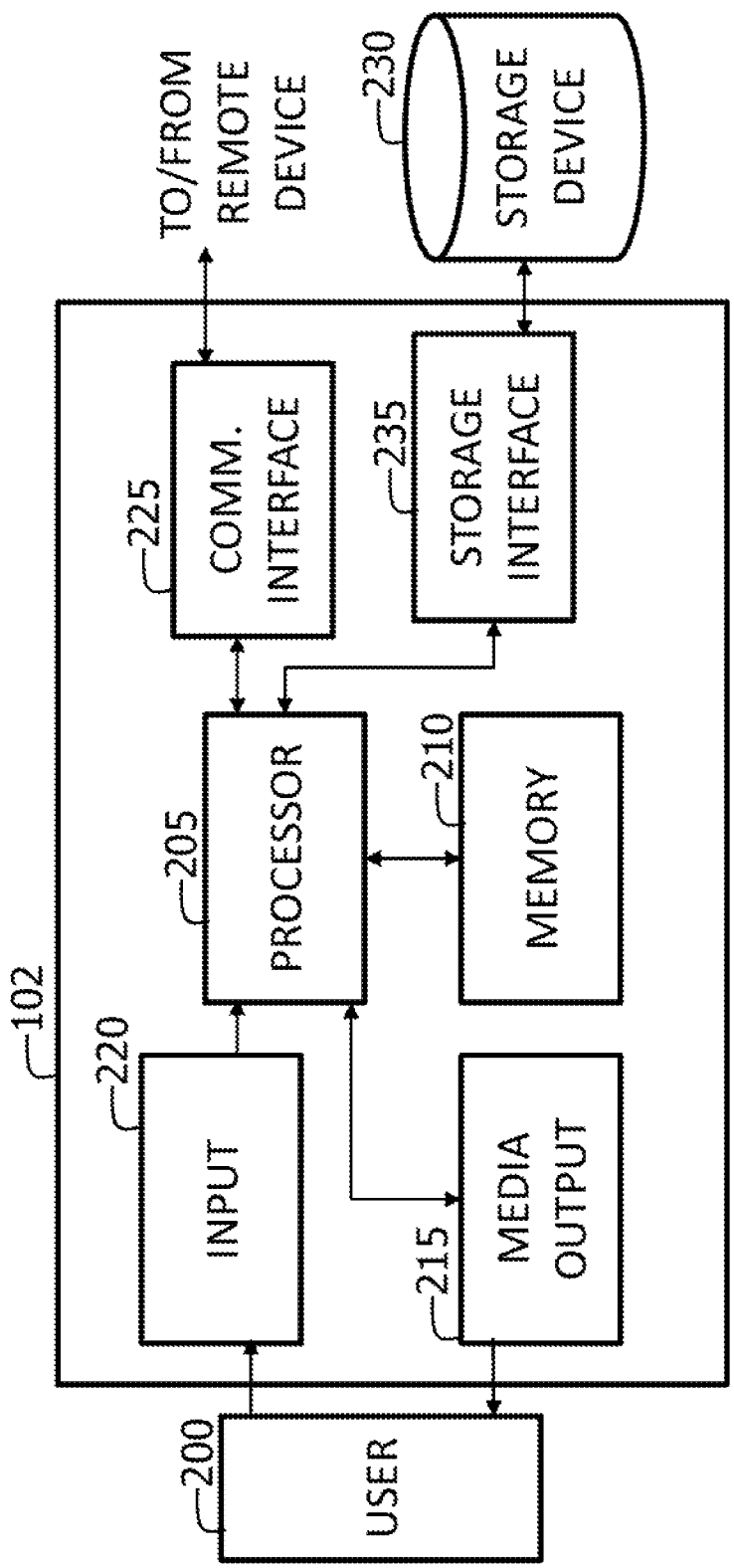
Figure 4:
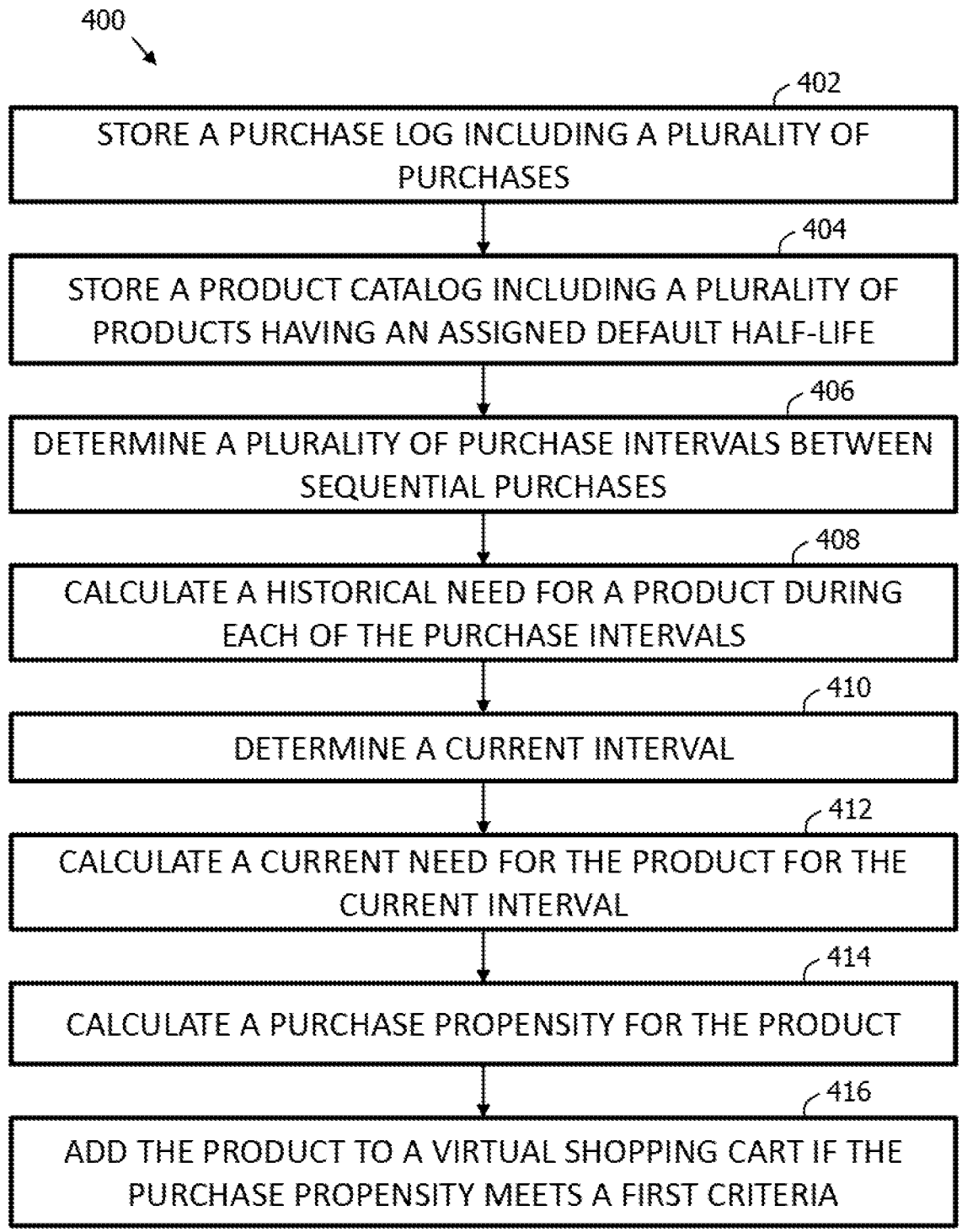

FIG. 2 is a block diagram of an example embodiment of the ESR 102 with usage pattern functionality shown in FIG. 1. It should be understood that the components of ESR 102 shown in FIG. 2 may be embodied in an alternative computing device that a smart refrigerator, including, but not limited to, another smart appliance, a user computing device or mobile computing device (e.g., a smart phone, tablet, laptop, desktop, "wearable," etc.), and/or a dedicated computing device integrated into a smart kitchen or smart home (e.g., a "smart home hub"). ESR 102 is operated by a user 200. ESR 102 includes a processor 205 for executing instructions. Processor 205 may be similar to processor 106 (shown in FIG. 1). In some embodiments, executable instructions are stored in a memory area 210. Processor 205 may include one or more processing units (e.g., in a multi-core configuration). Memory area 210 is any device allowing information such as executable instructions and/or transaction data to be stored and retrieved. Memory area 210 may include one or more computer-readable media. Processor 205 executes computer-executable instructions for implementing aspects of the disclosure. In some embodiments, processor 205 is transformed into a special-purpose microprocessor by executing computer-executable instructions or by otherwise being programmed. For example, processor 205 is programmed with instructions such as are illustrated in FIG. 4.

ESR 102 also includes at least one media output component 215 for presenting information to user 200. Media output component 215 is any component capable of conveying information to user 200. In some embodiments, media output component 215 includes an output adapter (not shown) such as a video adapter and/or an audio adapter. The output adapter is operatively coupled to processor 205 and operatively couplable to an output device such as a display device (e.g., a liquid crystal display (LCD), organic light emitting diode (OLED) display, or "electronic ink" display) or an audio output device (e.g., a speaker or headphones). In some embodiments, media output component 215 is configured to present a graphical user interface (e.g., a web browser and/or a client application) to user 200. A graphical user interface may include, for example, an online store interface for viewing and/or purchasing items from a virtual shopping cart. Media output component 215 may include monitor 128 (shown in FIG. 1).

In some embodiments, ESR 102 includes an input device 220 for receiving input from user 200. User 200 may use input device 220 to, without limitation, select and/or enter one or more items to purchase and/or a purchase request, and/or to edit the virtual shopping cart. Input device 220 may include, for example, a keyboard, a pointing device, a mouse, a stylus, a touch-sensitive panel (e.g., a touch pad or a touch screen), a gyroscope, an accelerometer, a position detector, and/or an audio input device. A single component such as a touch screen (e.g., monitor 128) may function as both an output device of media output component 215 and input device 220.

ESR 102 may also include a communication interface 225, which is communicatively couplable to a remote device such as merchant computing device 104 and/or database 108 (shown in FIG. 1). Communication interface 225 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 210 are, for example, computer-readable instructions for providing a user interface (e.g., user interface 110, shown in FIG. 1) to user 200 via media output component 215 and, optionally, receiving and processing input from input device 220. A user interface may include, among other possibilities, a web browser and/or a client application. Web browsers enable users, such as user 200, to display and interact with media and other information typically embedded on a web page or a website from ESR 102 and/or merchant computing device 104. A client application allows user 200 to interact with, for example, ESR 102 and/or merchant computing device 104. For example, instructions may be stored by a cloud service, and the output of the execution of the instructions sent to media output component 215.

Processor 205 may also be operatively coupled to a storage device 230. Storage device 230 is any computer-operated hardware suitable for storing and/or retrieving data, such as, but not limited to, data associated with database 108. In some embodiments, storage device 230 is integrated in ESR 102. For example, ESR 102 may include one or more hard disk drives as storage device 230. In other embodiments, storage device 230 is external to ESR 102. For example, storage device 230 may include a storage area network (SAN), a network-attached storage (NAS) system, and/or multiple storage units such as hard disks and/or solid-state disks in a redundant array of inexpensive disks (RAID) configuration.

In some embodiments, processor 205 is operatively coupled to storage device 230 via a storage interface 235. Storage interface 235 is any component capable of providing processor 205 with access to storage device 230. Storage interface 230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 205 with access to storage device 230.

Figure 3:
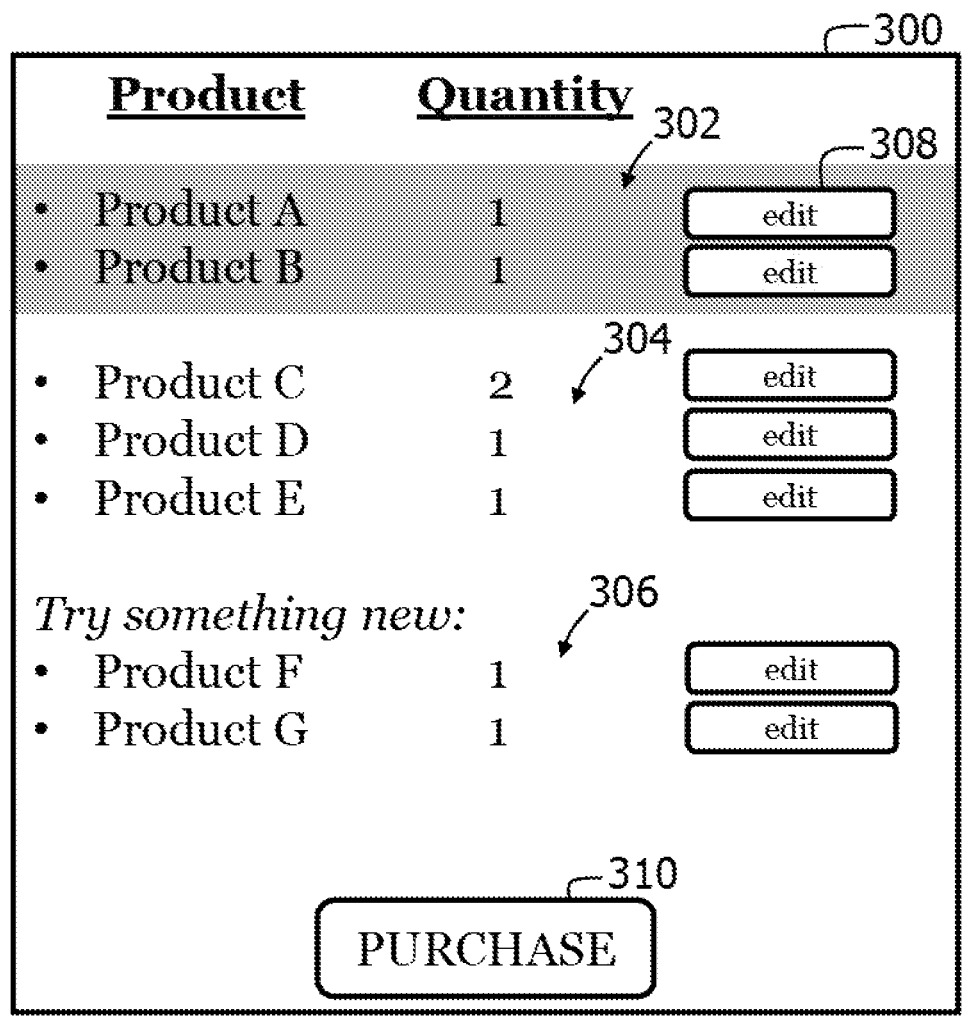

FIG. 3 is an example embodiment of a virtual shopping cart 300 automatically populated by the enhanced smart refrigerator (ESR) 102 shown in FIG. 2. As described above, ESR 102 is configured to automatically populate virtual shopping cart 300 according to the usage behavior of a particular user associated with virtual shopping cart 300 and ESR 102. In the example embodiment, virtual shopping cart 300 has been populated with five products, labelled as Products A-G. A quantity of each item is also displayed. For example, Product C has a quantity of 2. ESR 102 may have logged a plurality of purchases by the user in which the user frequently or always purchases two of Product C. ESR 102 is configured to automatically add the appropriate quantity of the product to virtual shopping cart 300.

In the example embodiment, Product A and Product B are shown in a highlighted region or "needed products" 302, whereas Products C, D, and E are shown in a non-highlighted region or "suggested products" region 304, and Products F and G are shown in a "new products" region 306. ESR 102 is configured to automatically populate shopping cart 300 according to the output of a usage pattern algorithm, or a purchase propensity for each item, and/or according to the output of a cart population algorithm. The cart population takes the output of the usage pattern algorithm, as well as a global purchase probability, to determine which of regions 302, 304, and 306 to which to add a product, as described herein. The purchase propensity is a value that characterized whether the user is likely to purchase or not purchase the product during their next checkout. In one embodiment, if the purchase propensity for a product meets a first criteria (e.g., meets exceeds a particular threshold), ESR 102 adds the product to virtual shopping cart 300.

In one embodiment, ESR 102 is configured to add a product to needed products region 302 of virtual shopping cart 300 if the purchase propensity for a product meets the first criteria and a second criteria. For example, if the first criteria is a first threshold purchase propensity of 0.5, ESR 102 may automatically add any product for which the calculated purchase propensity is greater than or equal to 0.5. A second criteria may be a second purchase propensity of 0.6 or 0.7, which indicates a much higher likelihood that the user will purchase the product. ESR 102 may be configured to add products that meet or exceed both the first and second threshold purchase propensity to the highlighted region 302 of virtual shopping cart 300. ESR 102 may add products that meet or exceed only the first threshold purchase propensity to the non-highlighted region 304 of virtual shopping cart 300. As another example, a second criteria may be a purchase frequency, such as a percentage or fraction of purchases that include the product (e.g., the user purchases the product in 90% of their purchases). ESR 102 may be configured to add products that meet both the first and second criteria (i.e., likely to purchase based on usage/need and purchase frequency) to the highlighted region of virtual shopping cart 300.

In another embodiment, ESR 102 is configured to add a product to needed products region 302 of virtual shopping cart 300 if the output from the cart population algorithm (Equation 6, shown above) meets a threshold defined for needed products region 302. The threshold output ("score") of the cart population algorithm, defined for needed products region 302, may be a constant value, such as 0.5, for any product that has been purchased at least once by the consumer. Accordingly, any product with a score greater than 0.5 may be added to needed products region 302. ESR 102 is further configured to add a product to suggested products region 304 of virtual shopping cart 300 if the output from the cart population algorithm meets a threshold defined for suggested products region 304. Products added to suggested products region 304 may be those products that the consumer likely does not need by a first proposed delivery date, or the next upcoming delivery date, but that the consumer will likely need by a second proposed delivery date, or the next delivery date after the first proposed delivery date. The threshold for suggested products region 304 may be a certain number of products (e.g., 5, 10, or 15) with the top scores from the cart population algorithm that do not meet the threshold for being added to needed products region 302 (e.g., having scores of 0.40 to 0.49).

ESR 102 may be further configured to prompt the consumer to purchase new products, or products that the consumer has not purchased before using ESR 102. As described above, using the default half-life and the current interval for not-before-purchased products in the usage pattern algorithm and the cart population algorithms, ESR 102 may define a threshold score for new products region 306 of a constant value (e.g., 0.5) and add a maximum number of products to new products region 306 that meet the threshold score.

Virtual shopping cart 300 also includes an "edit" option 308 associated with each product. The user may select edit option 308 to edit the particular product in the virtual shopping cart 300. For example, the user may remove the associated product from virtual shopping 300 if the user does not wish to purchase the product. The user may edit a quantity of the product that they wish to purchase, or may move the product from needed products region 302 to suggested products region 304, from new products region 306 to needed products region 302, and/or any other product move. ESR 102 is configured to use the user interactions with virtual shopping cart 300, such as interactions with edit option 308, to refine the usage pattern algorithm to the specific usage pattern of the user for each product and/or to refine the cart population algorithm. Virtual shopping cart 300 further includes a "purchase" option 310, to initiate a checkout process as directed by the merchant from whom the user is purchasing one or more items in virtual shopping cart 300. In the example embodiment, selecting the purchase option 310 initiates a purchase of all items in needed products region 302 but none of the products in either of suggested products region 304 or new products region 306. In other embodiments, selecting purchase option 310 may initiate a purchase of items in needed products region 302 and may prompt the user to also purchase products in one or both of suggested products region 304 and new products region 306.

FIG. 4 is a flowchart of a method 400 for automatically populating a virtual shopping cart based on consumer usage behavior using the virtual shopping system 100 shown in FIG. 1. Method 400 may be implemented by ESR 102, as shown in FIG. 1. Method 400 includes storing 402 a purchase log in a memory (e.g., database 108, shown in FIG. 1). The purchase log includes a plurality of purchases of at least one product and a date of each purchase of the plurality of purchases. Method 400 also includes storing 404 a product catalog in the memory. The product catalog includes a plurality of products including the at least one product, each product of plurality of products having an assigned default half-life. As described above, the default half-life may be assigned by ESR 102.

Method 400 further includes determining 406 a plurality of purchase intervals between sequential purchases of the plurality of purchases, using the purchase log. Method 400 also includes calculating 408 a historical need for the at least one product during each of the plurality of purchase intervals. Calculating 408 the historical need may be based on the default half-life, as described herein. Method 400 still further includes determining 410 a current interval between a most recent delivery date and a proposed next delivery date. In other words, ESR 102 may determine 410 how long it will be before the consumer will receive the product, which directs how much the consumer may need the product.

Method 400 also includes calculating 412 a current need for the at least one product for the current interval and calculating 414 a purchase propensity for the at least one product. Calculating 414 the purchase propensity is performed by inputting the default half-life, the plurality of purchase intervals, the calculated historical need, the current interval, and the calculated current need into the usage pattern component of ESR 102. In addition, method 400 includes adding 416 the at least one product to a virtual shopping cart if the calculated purchase propensity meets a first criteria (e.g., exceeds a threshold).

Figure 5:
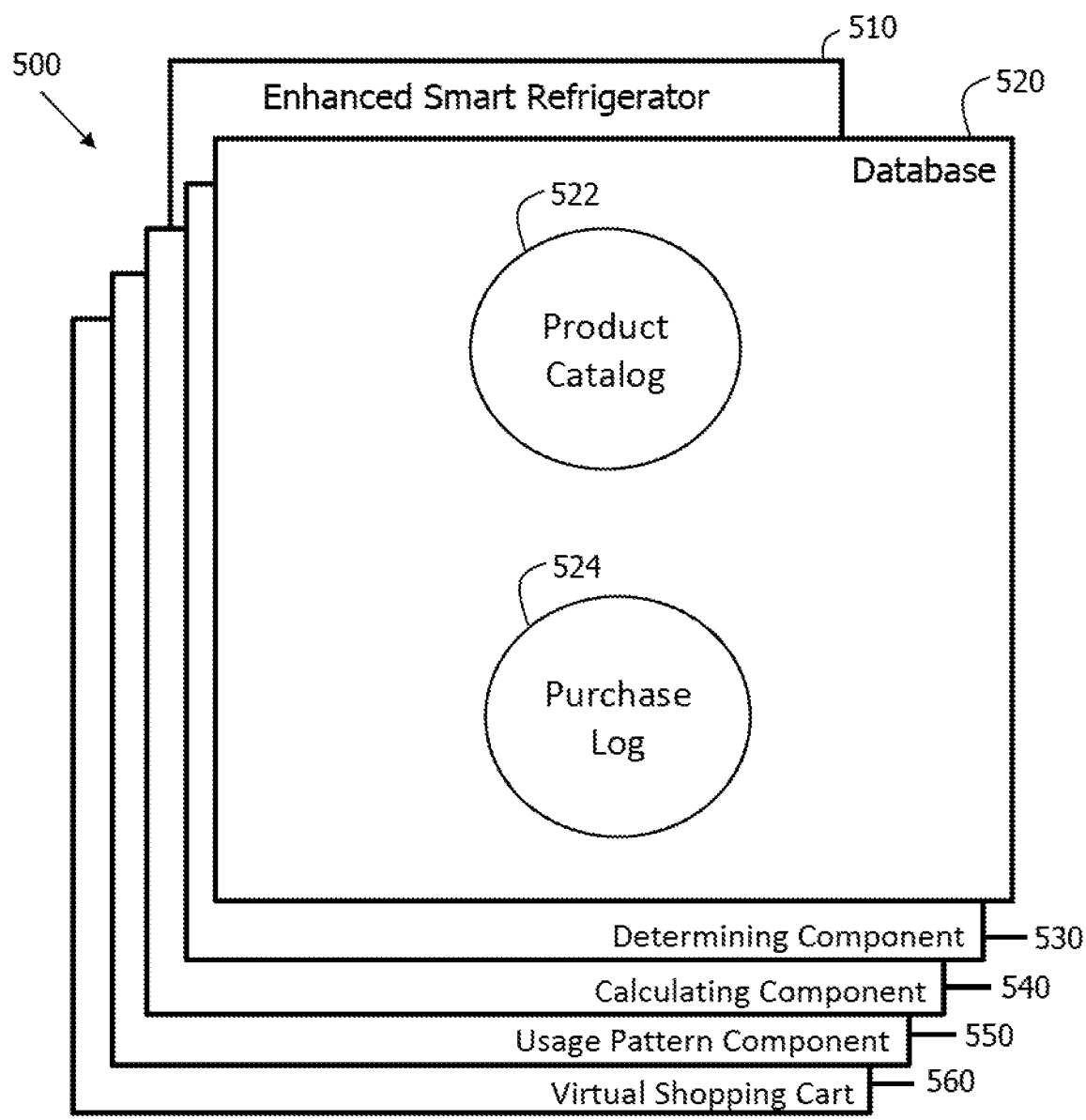

FIG. 5 is a diagram of components of an enhanced smart refrigerator (ESR) 510 that may be used in the virtual shopping system 100 shown in FIG. 1. In some embodiments, ESR 510 is similar to ESR 102 (shown in FIG. 1). A database 520 may be coupled with several separate components within ESR 510, which perform specific tasks. In this embodiment, database 520 includes at least one product catalog 522 and at least one purchase log 524 associated with a user. In some embodiments, database 520 is similar to database 108 (shown in FIG. 1). Database 520 is configured to store the at least one purchase log 524, including a plurality of purchases of at least one product and a date of each purchase of the plurality of purchases, and to store the at least one product catalog 522, including a plurality of products including the at least one product, each product of plurality of products having an assigned default half-life.

In the example embodiment, ESR 510 includes a determining component 530 and a calculating component 540. Although determining component 530 may be described as performing certain steps or functions and calculating component 540 may be described as performing other steps or functions in the example embodiment, at least some functions performed by one of determining component 530 and calculating component 540 may be performed by the other of determining component 530 and calculating component 540 in other embodiments. Determining component 530 is configured to determine, from the at least one purchase log 524, a plurality of purchase intervals between sequential purchases of the plurality of purchases. Determining component 530 is also configured to determine a current interval between a most recent delivery date and a proposed next delivery date.

Calculating component 540 is configured to calculate a historical need for the at least one product during each of the plurality of purchase intervals based on the default half-life for the at least one product stored in the at least product catalog 522. Calculating component 540 is further configured to calculate a current need for the at least one product for the current interval. Calculating component 540 is communicatively coupled to a usage pattern component 550, which takes at least the default half-life, the plurality of purchase intervals, the calculated historical need, the current interval, and the calculated current need as input into a usage pattern algorithm stored and/or executed thereon. Usage pattern component 550 is configured to execute the usage pattern algorithm and output a purchase propensity for the at least product. Usage pattern component 550 may be similar to usage pattern component 112 (shown in FIG. 1).

ESR 510 further includes a virtual shopping cart 560. Determining component 530 may be further configured to use the purchase propensity to determine whether ESR 510 should add the at least one product to virtual shopping cart 560. For example, if the purchase propensity meets a first criteria, ESR 510 adds the at least one product to virtual shopping cart 560.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the enhanced smart refrigerator are described herein as including general processing and memory devices, it should be understood that the enhanced smart refrigerator is a specialized computer having usage

The invention claimed is:

1. An enhanced smart refrigerator (ESR) for automatically populating a virtual shopping cart, said ESR comprising:
   a plurality of walls enclosing a refrigerated section;
   the virtual shopping cart;
   a user interface;
   a processor; and
   a memory in communication with said processor, wherein said processor is programmed to:
      receive a plurality of purchase inputs through said user interface, the plurality of purchase inputs initiating a plurality of purchases of a plurality of products;
      store a purchase log within the memory, the purchase log including a purchase history including the plurality of purchases of the plurality of products initiated using the user interface and a date of each purchase of the plurality of purchases;
      store a product catalog in the memory, wherein the product catalog includes the plurality of products and a respective assigned default half-life therefor, wherein the default half-life represents a default length of time from an initial purchase of a product by which a typical consumer consumes half of the product;
      for each of the products, determine a current interval between a most recent delivery date of the product and a proposed next delivery date of the product based on the purchase history of the product;
      for each of the products, access the purchase log stored within the memory to determine, from the purchase log, a plurality of purchase intervals between sequential past purchases of the product;
      for each of the products, calculate a purchase propensity for the product based on the current interval, the plurality of purchase intervals, and the default half-life of the product;
      display the virtual shopping cart including a plurality of display regions, the plurality of display regions including a first region including products for which the purchase propensity exceeds a first criteria indicating a high likelihood of purchase, and a second region including products for which the purchase propensity does not exceed the first criteria but exceeds a second criteria, wherein the products in the first region are pre-selected for purchase and the products in the second region are un-selected for purchase;
      enable, via the user interface, the user to de-select each of the products in the first region and select each of the products in the second region; and
      submit the selected products in the virtual shopping cart to a merchant computing device for purchase.

2. The ESR of claim 1, said processor further programmed to:
   for each of the products, calculate a historical need for the product during each of the plurality of purchase intervals; and
   calculate the purchase propensity further based on the calculated historical need.

3. The ESR of claim 1, wherein said processor is further programmed to:

for each of the products, calculate a current need for the product for the current interval; and calculate the purchase propensity further based on the calculated current need.

4. The ESR of claim 1, wherein the purchase propensity is a value between 0 and 1.

5. The ESR of claim 1, wherein the first criteria is a first threshold purchase propensity of 0.5.

6. The ESR of claim 1, wherein said processor is further programmed to determine at least one of an average need of n prior purchases and a median need of n prior purchases.

7. The ESR of claim 6, wherein n is one of 3, 5, and 10.

8. The ESR of claim 1, wherein said processor is further programmed to:

input a representation of user interaction with the first and second regions into a usage pattern component to update the calculated purchase propensity for each product that is manually selected or de-selected by the user.

9. The ESR of claim 1, said processor further programmed to display the products in the first region as highlighted.

10. The ESR of claim 1, said processor further programmed to calculate the purchase propensity for each of a second plurality of products based on a purchase history of other users.

11. The ESR of claim 10, said processor further programmed to display in the second region, based on the purchase propensity for the second plurality of products, at least one product of the second plurality of products which has never previously been added to the virtual shopping cart of the user.

12. The ESR of claim 10, said processor further programmed to display in a third region of the plurality of regions, based on the purchase propensity for the second plurality of products, at least one product of the second plurality of products which has never previously been added to the virtual shopping cart of the user.

13. A computer-implemented method for automatically populating a virtual shopping cart, said method implemented using an enhanced smart refrigerator (ESR) including a plurality of walls enclosing a refrigerated section, a processor, the virtual shopping cart, a memory in communication with the processor, and a user interface, said method comprising:

receiving, by the ESR, a plurality of purchase inputs through the user interface, the plurality of purchase inputs initiating a plurality of purchases of a plurality of products;

storing, by the ESR, a purchase log within the memory, the purchase log including a purchase history including the plurality of purchases of the plurality of products initiated using the user interface and a date of each purchase of the plurality of purchases;

storing a product catalog in the memory, wherein the product catalog includes the plurality of products and a respective assigned default half-life therefor, wherein the default half-life represents a default length of time from an initial purchase of a product by which a typical consumer consumes half of the product;

for each of the products, determining a current interval between a most recent delivery date of the product and a proposed next delivery date of the product based on the purchase history of the product;

for each of the products, accessing the purchase log stored within the memory to determine, from the purchase log, a plurality of purchase intervals between sequential past purchases of the product;

for each of the products, calculating a purchase propensity for the product based on the current interval, the plurality of purchase intervals, and the default half-life of the product;

displaying the virtual shopping cart including a plurality of display regions, the plurality of display regions including a first region including products for which the purchase propensity exceeds a first criteria indicating a high likelihood of purchase, and a second region including products for which the purchase propensity does not exceed the first criteria but exceeds a second criteria, wherein the products in the first region are pre-selected for purchase and the products in the second region are un-selected for purchase;

enabling, via the user interface, the user to de-select each of the products in the first region and select each of the products in the second region; and submitting the selected products in the virtual shopping cart to a merchant computing device for purchase.

14. The computer-implemented method of claim 13, further comprising:

for each of the products, calculating a historical need for the product during each of the plurality of purchase intervals, wherein calculating a purchase propensity for the product comprises calculating the purchase propensity further based on the calculated historical need.

15. The computer-implemented method of claim 13 further comprising calculating, for each of the products, a current need for the product for the current interval, wherein calculating a purchase propensity for the product comprises calculating the purchase propensity further based on the calculated current need.

16. The computer-implemented method of claim 13, wherein the purchase propensity is a value between 0 and 1.

17. The computer-implemented method of claim 13, wherein the first criteria is a first threshold purchase propensity of 0.5.

18. The computer-implemented method of claim 13 further comprising determining at least one of an average need of n prior purchases and a median need of n prior purchases.

19. The computer-implemented method of claim 13, further comprising:

inputting a representation of user interaction with the first and second regions into a usage pattern component to update the calculated purchase propensity for each product that is manually selected or de-selected by the user.

20. At least one non-transitory computer-readable storage media having computer-executable instructions embodied thereon, wherein the computer executable instructions, when executed by at least one processor of an enhanced smart refrigerator (ESR), the ESR including a plurality of walls enclosing a refrigerated section, a virtual shopping cart, a memory in communication with the at least one processor, and a user interface, cause the at least one processor to:

receive a plurality of purchase inputs through said user interface, the plurality of purchase inputs initiating a plurality of purchases of a plurality of products;

store a purchase log within the memory, the purchase log including a purchase history including the plurality of purchases of the plurality of products initiated using the user interface and a date of each purchase of the plurality of purchases of the target product;

store a product catalog in the memory, wherein the product catalog includes the plurality of products and a respective assigned default half-life therefor, wherein the default half-life represents a default length of time from an initial purchase of a product by which a typical consumer consumes half of the product;

for each of the products, determine a current interval between a most recent delivery date of the product and a proposed next delivery date of the product based on the purchase history of the product;

for each of the products, access the purchase log stored within the memory to determine, from the purchase log, a plurality of purchase intervals between sequential past purchases of the product;

for each of the products, calculate a purchase propensity for the product based on the current interval, the plurality of purchase intervals, and the default half-life of the product;

display the virtual shopping cart including a plurality of display regions, the plurality of display regions including a first region including products for which the purchase propensity exceeds a first criteria indicating a high likelihood of purchase, and a second region including products for which the purchase propensity does not exceed the first criteria but exceeds a second criteria, wherein the products in the first region are pre-selected for purchase and the products in the second region are un-selected for purchase;

enable, via the user interface, the user to de-select each of the products in the first region and select each of the products in the second region; and submit the selected products in the virtual shopping cart to a merchant computing device for purchase.

21. The compute-readable storage media of claim 20, wherein the computer-executable instructions further cause the at least one processor to:

for each of the products, calculate a historical need for the product during each of the plurality of purchase intervals; and calculate the purchase propensity further based on the calculated historical need.

22. The compute-readable storage media of claim 20, wherein the computer-executable instructions further cause the at least one processor to:

for each of the products, calculate a current need for the product for the current interval; and calculate the purchase propensity further based on the calculated current need.

23. The computer-readable storage media of claim 20, wherein the purchase propensity is a value between 0 and 1.

24. The computer-readable storage media of claim 20, wherein the first criteria includes a first threshold purchase propensity of 0.5.

25. The computer-readable storage media of claim 20, wherein the computer-executable instructions further cause the at least one processor to:

input a representation of user interaction with the first and second regions into a usage pattern component to update the calculated purchase propensity for each product that is manually selected or de-selected by the user.

26. A computing device for automatically populating a virtual shopping cart, said computing device comprising a processor, a memory, the virtual shopping cart, and a user interface, wherein said computing device is configured to:

receive a plurality of purchase inputs through said user interface, the plurality of purchase inputs initiating a plurality of purchases of a plurality of products;

store a purchase log within the memory, the purchase log including a purchase history including the plurality of purchases of the plurality of products initiated using said user interface and a date of each purchase of the plurality of purchases;

store a product catalog in the memory, wherein the product catalog includes a plurality of products and a respective assigned default half-life therefor, wherein the default half-life represents a default length of time from an initial purchase of a product by which a typical consumer consumes half of the product;

for each of the products, determine a current interval between a most recent delivery date of the product and a proposed next delivery date of the product based on the purchase history of the product;

for each of the products, access the purchase log stored within the memory to determine, from the purchase log, a plurality of purchase intervals between sequential past purchases of the product;

for each of the products, calculate a purchase propensity for the product based on the current interval, the plurality of purchase intervals, and the default half-life of the product;

display the virtual shopping cart including a plurality of display regions, the plurality of display regions including a first region including products for which the purchase propensity exceeds a first criteria indicating a high likelihood of purchase, and a second region including products for which the purchase propensity does not exceed the first criteria but exceeds a second criteria, wherein the products in the first region are pre-selected for purchase and the products in the second region are un-selected for purchase;

enable, via the user interface, the user to de-select each of the products in the first region and select each of the products in the second region; and for submission submit the selected products in the virtual shopping cart to a merchant computing device for purchase.

27. The computing device of claim 26, further configured to:

for each of the products, calculate a historical need for the product during each of the plurality of purchase intervals; and calculate the purchase propensity further based on the calculated historical need.

28. The computing device of claim 26, wherein said computing device is further configured to:

for each of the products, calculate a current need for the product for the current interval; and calculate the purchase propensity further based on the calculated current need.

29. The computing device of claim 26, wherein said computing device is embodied on a smart appliance.

* * * * *